United States Patent
Nitta et al.

(10) Patent No.: US 10,754,125 B2
(45) Date of Patent: Aug. 25, 2020

(54) IMAGING LENS

(71) Applicant: KANTATSU CO., LTD., Tochigi (JP)

(72) Inventors: Koji Nitta, Tokyo (JP); Yukio Sekine, Sukagawa (JP); Masaya Hashimoto, Sukagawa (JP)

(73) Assignee: KANTATSU CO., LTD., Yaita-shi, Tochigi (JP)

( * ) Notice: Subject to any disclaimer, the term of this patent is extended or adjusted under 35 U.S.C. 154(b) by 0 days.

(21) Appl. No.: 15/991,014

(22) Filed: May 29, 2018

(65) Prior Publication Data
US 2019/0129137 A1 May 2, 2019

(30) Foreign Application Priority Data

May 29, 2017 (JP) ................. 2017-106027

(51) Int. Cl.
G02B 13/18 (2006.01)
G02B 9/62 (2006.01)
H04N 5/225 (2006.01)
G02B 9/60 (2006.01)
G02B 13/00 (2006.01)
G02B 5/00 (2006.01)
G02B 3/04 (2006.01)

(52) U.S. Cl.
CPC ............... G02B 9/62 (2013.01); G02B 9/60 (2013.01); G02B 13/0045 (2013.01); H04N 5/2254 (2013.01); G02B 3/04 (2013.01); G02B 5/005 (2013.01); G02B 13/002 (2013.01); G02B 13/18 (2013.01)

(58) Field of Classification Search
CPC ...... G02B 13/0045; G02B 9/62; G02B 5/005; G02B 13/18; G02B 13/002; G02B 3/04; G02B 9/60; H04N 5/2254
USPC ............... 359/713, 739, 740, 756, 757, 759
See application file for complete search history.

(56) References Cited

U.S. PATENT DOCUMENTS

| 8,885,268 B2* | 11/2014 | Tang | G02B 9/62 359/708 |
| 2014/0078603 A1 | 3/2014 | You | |
| 2015/0029599 A1 | 1/2015 | Huang | |
| 2015/0070578 A1* | 3/2015 | Chen | G02B 9/62 359/756 |

(Continued)

FOREIGN PATENT DOCUMENTS

| CN | 106997084 A | 8/2017 |
| JP | 2012-155223 A | 8/2012 |

(Continued)

Primary Examiner — Evelyn A Lester
(74) Attorney, Agent, or Firm — Hamre Schumann, Mueller & Larson, P.C.

(57) ABSTRACT

There is provided an imaging lens with high resolution which satisfies in well balance the low-profileness and the low F-number and properly corrects aberrations.

An imaging lens comprises a first lens having positive refractive power, a second lens having the positive refractive power, a third lens, a fourth lens, a fifth lens being a double-sided aspheric lens, and a sixth lens being double-sided aspheric lens and having a concave surface facing the image side near the optical axis, wherein the image-side surface of the sixth lens is an aspheric surface changing to the convex surface at a peripheral area.

20 Claims, 14 Drawing Sheets

(56) References Cited

U.S. PATENT DOCUMENTS

| | | | |
|---|---|---|---|
| 2015/0070579 A1* | 3/2015 | Chen | G02B 9/62 359/756 |
| 2015/0070784 A1* | 3/2015 | Chen | G02B 9/62 359/713 |
| 2015/0241662 A1 | 8/2015 | Hashimoto | |
| 2015/0301312 A1* | 10/2015 | Chen | G02B 7/021 359/757 |
| 2015/0301315 A1* | 10/2015 | Chen | G02B 13/0045 359/713 |
| 2016/0004044 A1* | 1/2016 | Kubota | G02B 13/0045 359/713 |
| 2016/0054543 A1* | 2/2016 | Nabeta | G02B 13/0045 359/713 |
| 2016/0062081 A1* | 3/2016 | Kubota | G02B 13/0045 359/757 |
| 2016/0119510 A1* | 4/2016 | Chen | G02B 13/0045 359/740 |
| 2016/0119519 A1* | 4/2016 | Chen | H04N 5/2254 359/759 |
| 2016/0170182 A1 | 6/2016 | Tanaka | |
| 2017/0031133 A1 | 2/2017 | Liu et al. | |
| 2017/0031134 A1 | 2/2017 | Liu et al. | |
| 2017/0146775 A1 | 5/2017 | Jung | |
| 2017/0212333 A1 | 7/2017 | Huang | |

FOREIGN PATENT DOCUMENTS

| | | |
|---|---|---|
| JP | 2014-059561 A | 4/2014 |
| JP | 2015-158569 A | 9/2015 |
| JP | 2016-14759 A | 1/2016 |
| JP | 2016114803 A | 6/2016 |
| TW | 201704804 A | 2/2017 |
| TW | 201704805 A | 2/2017 |
| TW | I588526 B | 6/2017 |
| WO | 2014/162779 A1 | 10/2014 |

* cited by examiner

IMAGING LENS

The present application is based on and claims priority of a Japanese patent application No. 2017-106027 filed on May 29, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly to an imaging lens which is built in an imaging device mounted in an increasingly compact and low-profile smartphone and mobile phone, an information terminal such as a PDA (Personal Digital Assistant), a game console, PC and a robot, and moreover, a home appliance and an automobile with camera function.

Description of the Related Art

In recent years, it becomes common that camera function is mounted in a home appliance, information terminal equipment, an automobile and public transportation. Demand of products with the camera function is more increased, and development of products is being made accordingly.

The imaging lens mounted in such equipment is required to be compact and have high-resolution performance. For Example, Patent Document 1 (JP2012-155223A) and Patent Document 2 (JP2016-114803) disclose the imaging lens comprising six lenses.

Patent Document 1 discloses an imaging lens comprising, in order from an object side, a first lens group having positive refractive power, second lens group having negative refractive power, a third lens group having the positive refractive power, a fourth lens group having the negative refractive power, a fifth lens group having the positive refractive power, and a sixth lens group having the negative refractive power.

Patent Document 2 discloses an imaging lens comprising, in order from an object side, a first lens having a convex surface facing the object side and positive refractive power, a second lens having negative refractive power, a third lens having the convex surface facing the object side, a fourth lens having the positive refractive power, a fifth lens having the negative refractive power, and a sixth lens having the negative refractive power.

However, in lens configurations disclosed in the above-described Patent Documents 1 and 2, when low-profileness and low F-number are to be realized, it is very difficult to correct aberration at a peripheral area, and excellent optical performance can not be obtained.

The present invention has been made in view of the above-described problems, and an object of the present invention is to provide an imaging lens with high resolution which satisfies in well balance the low-profileness and the low F-number and excellently corrects aberrations.

Regarding terms used in the present invention, a convex surface, a concave surface or a plane surface of lens surfaces implies that a shape of the lens surface near an optical axis (paraxial portion), refractive power implies the refractive power near the optical axis (paraxial portion). The pole point implies an off-axial point on an aspheric surface at which a tangential plane intersects the optical axis perpendicularly. The total track length is defined as a distance along the optical axis from an object-side surface of an optical element located closest to the object to an image plane, when thickness of an IR cut filter or a cover glass which may be arranged between the imaging lens and the image plane is regarded as an air.

An imaging lens according to the present invention which forms an image of an object on a solid-state image sensor, comprises in order from an object side to an image side, a first lens having positive refractive power, a second lens having the positive refractive power, a third lens, a fourth lens, a fifth lens being a double-sided aspheric lens, and a sixth lens being a double-sided aspheric lens and having a concave surface facing the image side near the optical axis, wherein the image-side surface of the sixth lens is an aspheric surface changing to the convex surface at a peripheral area.

In the above-described configuration, the first lens achieves low-profileness and wide field of view of the imaging lens by the positive refractive power. The second lens has the positive refractive power, achieves the low-profileness and wide field of view of the imaging lens, and properly corrects astigmatism and field curvature. The third lens and the fourth lens maintain the low-profileness and properly correct aberrations such as spherical aberration, coma aberration, astigmatism and field curvature in well balance. The fifth lens is the double-sided aspheric lens, and therefore reduces burden on the sixth lens which corrects the field curvature and the distortion, and controls light ray incident angle to the image sensor. The sixth lens maintains the low-profileness and secures back focus. Furthermore, the sixth lens is the double-sided aspheric lens, and therefore corrects the field curvature and the distortion, and controls the light ray incident angle to the image sensor.

According to the imaging lens of the above-described configuration, it is preferable that a below conditional expression (1) is satisfied:

$$1.5 < vd4/vd5 < 3.6 \quad (1)$$

where
vd4: abbe number at d-ray of a fourth lens, and
vd5: abbe number at d-ray of a fifth lens.

The conditional expression (1) defines relationship between the abbe numbers at d-ray of the fourth lens and the fifth lens, and is a condition for properly correcting chromatic aberration of magnification. By satisfying the conditional expression (1), the chromatic aberration of magnification is properly corrected.

According to the imaging lens of the above-described configuration, it is preferable that a below conditional expression (2) is satisfied:

$$0.30 < (T3/TTL) \times 100 < 0.85 \quad (2)$$

where
T3: distance along an optical axis from an image-side surface of the third lens to an object-side surface of the fourth lens, and
TTL: distance along an optical axis from an object-side surface of the first lens to an image plane.

The conditional expression (2) defines an appropriate scope of the distance along an optical axis from the image-side surface of the third lens to the object-side surface of the fourth lens, and is a condition for achieving the low-profileness and proper aberration correction. By satisfying the conditional expression (2), total track length can be shortened, the light ray incident angle to the fourth lens becomes appropriate, and excessive occurrence of the spherical aberration, the coma aberration and the distortion is suppressed.

According to the imaging lens of the above-described configuration, it is preferable that a below conditional expression (3) is satisfied:

$$0.5 < vd1/(vd2+vd3) < 1.0 \quad (3)$$

where
vd1: abbe number at d-ray of a first lens,
vd2: abbe number at d-ray of a second lens, and
vd3: abbe number at d-ray of a third lens.

The conditional expression (3) defines relationship between the abbe numbers at d-ray of the first lens, the second lens and the third lens, and is a condition for properly correcting axial chromatic aberration. By satisfying the conditional expression (3), the axial chromatic aberration is more properly corrected.

According to the imaging lens of the above-described configuration, it is preferable that the second lens has a biconvex shape having convex surfaces facing the object side and the image side near the optical axis, or a meniscus shape having a concave surface facing the object side near the optical axis.

When the second lens has the biconvex shape near the optical axis, the positive refractive power can be appropriately allocated to the object-side surface and the image-side surface. Therefore, large positive refractive power can be provided while suppressing occurrence of the spherical aberration. As a result, the imaging lens can achieve further low-profileness and wide field of view.

On the other hand, when the second lens has the meniscus shape having a concave surface facing the object side near the optical axis, the light ray incident angle to the second lens can be appropriately controlled, and the coma aberration and high-order spherical aberration are properly corrected.

According to the imaging lens of the above-described configuration, it is preferable that the fourth lens has the positive refractive power. Furthermore, a shape of the fourth lens is preferably the biconvex shape having convex surfaces facing the object side and the image side near the optical axis, or a meniscus shape having a concave surface facing the object side near the optical axis.

When the fourth lens has the biconvex shape near the optical axis, the positive refractive power can be appropriately allocated to the object-side surface and the image-side surface. Therefore, large positive refractive power can be provided while suppressing occurrence of the spherical aberration. As a result, the imaging lens can achieve further low-profileness and wide field of view.

On the other hand, when the fourth lens has the meniscus shape having a concave surface facing the object side near the optical axis, the light ray incident angle to the fourth lens can be appropriately controlled, and the coma aberration and the high-order spherical aberration are properly corrected.

According to the imaging lens of the above-described configuration, it is preferable that a below conditional expression (4) is satisfied:

$$1.35 < f1/f < 3.30 \quad (4)$$

where
f1: focal length of the first lens, and
f: focal length of the overall optical system.

The conditional expression (4) defines the refractive power of the first lens, and is a condition for achieving the low-profileness and the proper aberration correction. When a value is below the upper limit of the conditional expression (4), the positive refractive power of the first lens becomes appropriate, and the low-profileness is facilitated. On the other hand, when the value is above the lower limit of the conditional expression (4), the high-order spherical aberration and the coma aberration can be properly corrected.

According to the imaging lens of the above-described configuration, it is preferable that a below conditional expression (5) is satisfied:

$$0.8 < f2/f < 3.4 \quad (5)$$

where
f2: focal length of the second lens, and
f: focal length of the overall optical system.

The conditional expression (5) defines the refractive power of the second lens, and is a condition for achieving the low-profileness and the proper aberration correction. When a value is below the upper limit of the conditional expression (5), the positive refractive power of the second lens becomes appropriate, and the low-profileness is facilitated. On the other hand, when the value is above the lower limit of the conditional expression (5), the high-order spherical aberration and the coma aberration can be properly corrected.

According to the imaging lens of the above-described configuration, it is preferable that a below conditional expression (6) is satisfied:

$$-1.70 < f3/f < 0.65 \quad (6)$$

where
f3: focal length of the third lens, and
f: focal length of the overall optical system.

The conditional expression (6) defines the refractive power of the third lens, and is a condition for reducing sensitivity to manufacturing error and for properly correcting the distortion. When the refractive power of the third lens is not large or small more than necessary, the sensitivity to manufacturing error can be reduced and the coma aberration and the distortion at a peripheral area can be properly corrected.

According to the imaging lens of the above-described configuration, it is preferable that a below conditional expression (7) is satisfied:

$$0.65 < f4/f < 2.10 \quad (7)$$

where
f4: focal length of the fourth lens, and
f: focal length of the overall optical system.

The conditional expression (7) defines the refractive power of the fourth lens, and is a condition for achieving the low-profileness and the proper aberration correction. When a value is below the upper limit of the conditional expression (7), the positive refractive power of the fourth lens becomes appropriate, and the low-profileness can be achieved. On the other hand, when the value is above the lower limit of the conditional expression (7), the high-order spherical aberration and the coma aberration can be properly corrected.

According to the imaging lens of the above-described configuration, it is preferable that a below conditional expression (8) is satisfied:

$$1.9 < |f6|/f \quad (8)$$

where
f6: focal length of the sixth lens, and
f: focal length of the overall optical system.

The conditional expression (8) defines the refractive power of the sixth lens, and is a condition for achieving the low-profileness and the proper aberration correction. When the value is above the lower limit of the conditional expression (8), the chromatic aberration is corrected, the total track length is shortened and the field curvature can be properly corrected.

According to the imaging lens of the above-described configuration, it is preferable that the fifth lens has plane surfaces on both sides near the optical axis, and has no substantial refractive power near the optical axis.

When the fifth lens has plane surfaces on both side near the optical axis, and has no substantial refractive power near the optical axis, the aberrations such as the chromatic aberration of magnification can be properly corrected without affecting the focal length of the overall optical system or allocation of the refractive power of other lenses.

The fifth lens is not limited to a shape having plane surfaces on the both sides near the optical axis. If effect on the focal length of the overall optical system or the refractive power of each lens is suppressed to small, various shapes may be applicable for the fifth lens, such as a meniscus shape having the convex surface facing the object side, a biconvex shape having the convex surfaces facing the object side and the image side, a meniscus shape having the concave surface facing the object side, a biconcave shape having the concave surfaces facing the object side and the image side, a shape having a plane surface facing the object side and a convex or a concave surface facing the image side, and a shape having the plane surface facing the image side and the convex or the concave surface facing the object side.

According to the imaging lens of the above-described configuration, it is preferable that a below conditional expression (9) is satisfied:

$$0.1 < D6/\Sigma D < 0.3 \qquad (9)$$

where

D6: thickness on the optical axis of the sixth lens, and $\Sigma D$: total sum of thickness on the optical axis of the first lens, the second lens, the third lens, the fourth lens, the fifth lens and the sixth lens.

The conditional expression (9) defines the thickness on the optical axis of the sixth lens to the total sum of each thickness on the optical axis of the first lens to the sixth lens, and is a condition for achieving improvement of formability and proper aberration correction. By satisfying the conditional expression (9), the thickness of the sixth lens becomes appropriate, and uneven thickness of a center area and a peripheral area of the sixth lens becomes small. As a result, the formability of the sixth lens can be improved. Furthermore, by satisfying the conditional expression (9), the thickness on the optical axis of the first to the fifth lenses and intervals therebetween can be appropriately determined, and freedom in the aspheric surface is improved. Therefore, the proper aberration correction can be made.

According to the imaging lens of the above-described configuration, it is preferable that a below conditional expression (10) is satisfied:

$$0.7 < \Sigma(L1F-L6R)/f < 1.6 \qquad (10)$$

where $\Sigma(L1F-L6R)$: distance along the optical axis from the object-side surface of the first lens to the image-side surface of the sixth lens, and f: focal length of the overall optical system.

The conditional expression (10) defines the distance along the optical axis from the object-side surface of the first lens to the image-side surface of the sixth lens to the focal length of the overall optical system, and is a condition for achieving the low-profileness and proper aberration correction. When a value is below the upper limit of the conditional expression (10), the back focus is secured and space for arranging a filter is also secured. On the other hand, when the value is above the lower limit of the conditional expression (10), thickness of each lens of which the imaging lens is comprised is easily secured. Furthermore, each interval of lenses can be appropriately determined, and therefore the freedom in the aspheric surface is improved. Therefore, the proper aberration correction can be made.

According to the imaging lens of the above-described configuration, it is preferable that a shape of the third lens is a meniscus shape having the concave surface facing the object side near the optical axis. Furthermore, it is more preferable that a below conditional expression (11) is satisfied:

$$0.1 < r5/r6 < 0.7 \qquad (11)$$

where r5: paraxial curvature radius of the object-side surface of the third lens, and r6: paraxial curvature radius of the image-side surface of the third lens.

The conditional expression (11) defines relationship of the curvature radii of the object-side surface and the image-side surface of the third lens, and is a condition for properly correcting the aberrations. When the shape near the optical axis of the third lens is the meniscus shape satisfying a scope of the conditional expression (11), the coma aberration and the astigmatism can be properly corrected.

According to the imaging lens of the above-described configuration, it is preferable that below conditional expressions (12) and (13) are satisfied:

$$0.20 < r11/f < 0.55 \qquad (12)$$

$$0.15 < r12/f < 0.45 \qquad (13)$$

where r11: paraxial curvature radius of the object-side surface of the sixth lens, r12: paraxial curvature radius of the image-side surface of the sixth lens, and f: focal length of the overall optical system.

The conditional expressions (12) and (13) define a shape near the optical axis of the sixth lens, and are conditions for securing the back focus and achieving the low-profileness. By satisfying the conditional expressions (12) and (13), appropriate back focus is secured and the low-profileness can be achived.

According to the imaging lens of the above-described configuration, it is preferable that a below conditional expression (14) is satisfied:

$$Fno \leq 2.0 \qquad (14)$$

where

Fno: F-number.

The conditional expression (14) defines the F-number. When a value is below the upper limit of the conditional expression (14), brightness required for the imaging lens in recent years can be fully secured, if it is mounted in a portable mobile device, a monitoring camera, or an onboard camera.

According to the imaging lens of the above-described configuration, it is preferable that a below conditional expression (15) is satisfied:

$$0.6 < f2/f4 < 2.6 \qquad (15)$$

where f2: focal length of the first lens, and f4: focal length of the fourth lens.

The conditional expression (15) defines an appropriate scope of a ratio between the refractive power of the second lens and the refractive power of the fourth lens, and a condition for achieving the low-profileness and the proper aberration correction. By satisfying the conditional expression (15), the large refractive power is appropriately balanced to the second lens and the fourth lens, the low-profileness and the wide field of view is achieved, and proper correction of the astigmatism and the field curvature can be made.

According to the imaging lens of the above-described configuration, it is preferable that a below conditional expression (16) is satisfied:

$$0.60 < T3/T4 < 1.35 \qquad (16)$$

where

T3: distance along an optical axis from an image-side surface of the third lens to an object-side surface of the fourth lens, and T4: distance along an optical axis from an image-side surface of the fourth lens to an object-side surface of the fifth lens.

The conditional expression (16) defines a ratio of an interval between the third lens and the fourth lens, and an interval between the fourth lens and the fifth lens, and is a condition for achieving the low-profileness and the proper aberration correction. By satisfying the conditional expression (16), difference between the interval of the third lens and the fourth lens and the interval of the fourth lens and the fifth lens is suppressed not to be increased, and the low-profileness is achieved. Furthermore, by satisfying the conditional expression (16), the fourth lens is arranged at an optimum position, and aberration correction function of the lens becomes more effective.

According to the imaging lens of the above-described configuration, it is preferable that a below conditional expression (17) is satisfied:

$$5 < (D5/TTL) \times 100 < 12 \qquad (17)$$

where

D5: thickness on the optical axis of the fifth lens, and

TTL: distance along an optical axis from an object-side surface of the first lens to an image plane.

The conditional expression (17) defines an appropriate thickness on the optical axis of the fifth lens, and is a condition for maintaining proper formability of the fifth lens and achieving the low-profileness.

When a value is below the upper limit of the conditional expression (17), the thickness on the optical axis of the fifth lens is prevented from being excessively large, and securing an air gap of the object side and the image side of the fifth lens is facilitated. Therefore, the low-profileness can be maintained. On the other hand, when the value is above the lower limit of the conditional expression (17), the thickness on the optical axis of the fifth lens is prevented from being excessively small, and the formability of the lens becomes proper.

Effect of Invention

According to the present invention, there can be provided an imaging lens with high resolution which satisfies in well balance the low-profileness and the low F-number, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11 and 13 are schematic views of the imaging lenses in Examples 1 to 7 according to the embodiments of the present invention, respectively.

Figure 1:
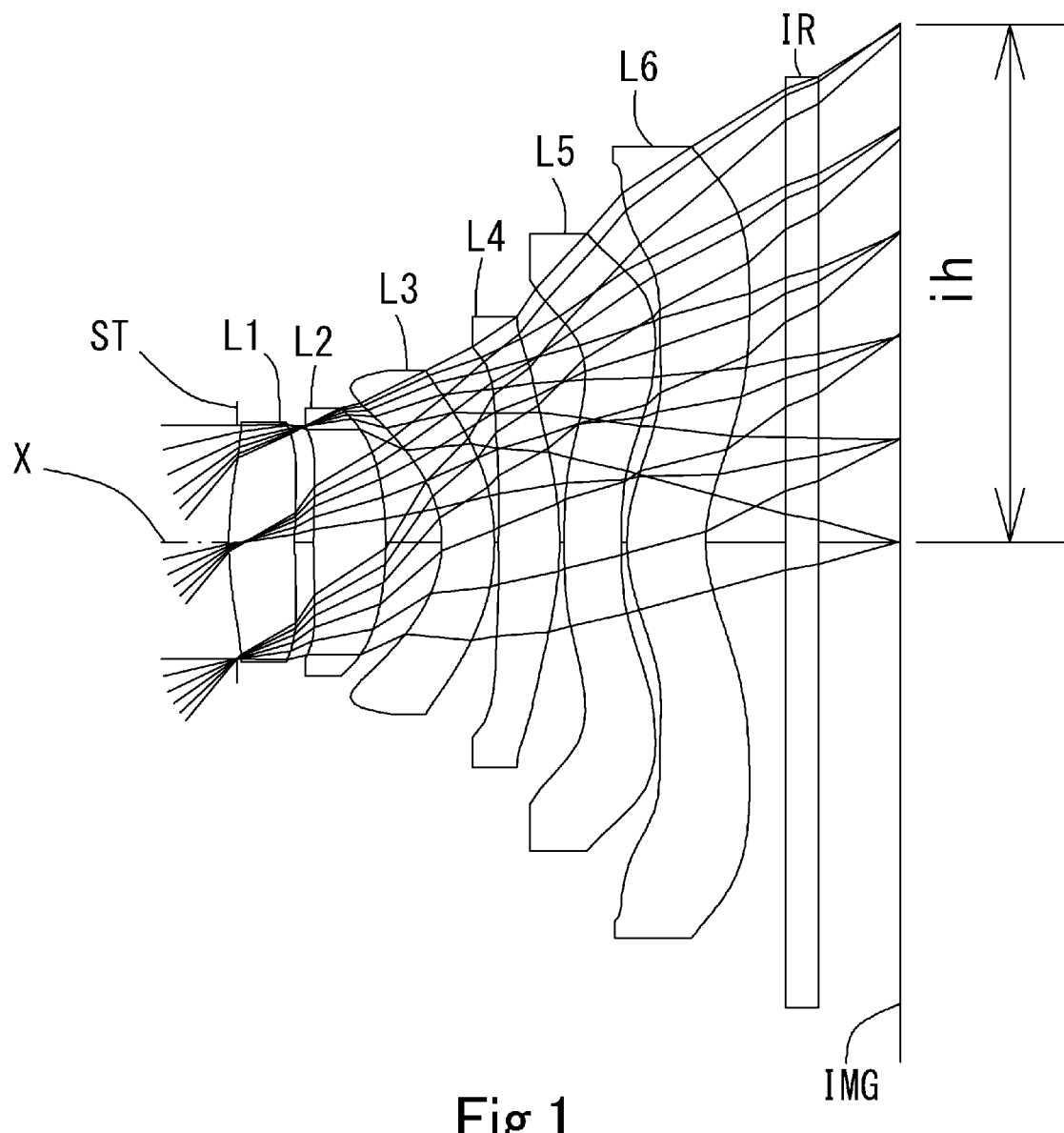
FIG. 1 is a schematic view showing a general configuration of an imaging lens in Example 1 according to the present invention.

As shown in FIG. 1, the imaging lens according to the present embodiments comprises in order from an object side to an image side, a first lens L1 having positive refractive power, a second lens L2 having the positive refractive power, a third lens L3, a fourth lens L4, a fifth lens L5 being a double-sided aspheric lens, and a sixth lens L6 having a concave surface facing the image side near the optical axis X. The image-side surface of the sixth lens L6 is an aspheric surface changing to the convex surface at a peripheral area.

A filter IR such as an IR cut filter and a cover glass are arranged between the sixth lens L6 and an image plane IMG. The filter IR is omissible.

The first lens L1 has the positive refractive power, and occurrence of aberrations is suppressed by aspheric surfaces on both sides and low-profileness and wide field of view of the imaging lens are achieved. The first lens L1 has a meniscus shape having a convex surface facing the object side near the optical axis X, or a biconvex shape having convex surfaces facing the object side and the image side near the optical axis X. In an Example shown in FIG. 1, an Example 2 shown in FIG. 3, an Example 3 shown in FIG. 5, an Example 5 shown in FIG. 9 and an Example 7 shown in FIG. 13, the first lens L1 has the meniscus shape having the convex surface facing the object side near the optical axis X. In this case, a position of principal point on the image side of the imaging lens moves toward the object side, and it is advantageous for the low-profileness. In an Example 4 shown in FIG. 7 and an Example 6 shown in FIG. 11, the first lens L1 has the biconvex shape having the convex surfaces facing the object side and the image side near the optical axis X. In this case, the position of principal point on the image side of the imaging lens moves toward the image side, and it is advantageous for the wide field of view.

The second lens L2 has the positive refractive power, and astigmatism and field curvature are properly corrected by aspheric surfaces on both sides and the low-profileness and the wide field of view of the imaging lens are achieved. The second lens L2 has the biconvex shape having the convex surfaces facing the object side and the image side near the optical axis X, or a meniscus shape having a concave surface facing the object side near the optical axis X. In the Example 1 shown in FIG. 1, the Example 2 shown in FIG. 3, the Example 3 shown in FIG. 5, the Example 4 shown in FIG. 7 and the Example 7 shown in FIG. 13, the second lens L2 has the biconvex shape having the convex surfaces facing the object side and the image side near the optical axis X. In this case, the positive refractive power is appropriately allocated to the object-side surface and the image-side surface. Therefore, large positive refractive power can be provided while suppressing occurrence of the spherical aberration. As a result, the imaging lens can achieve further low-profileness and wide field of view. In the Example 5 shown in FIG. 9 and the Example 6 shown in FIG. 11, the second lens L2 has the meniscus shape having a concave surface facing the object side near the optical axis X. In this case, the light ray incident angle to the second lens L2 can be appropriately controlled, and the coma aberration and high-order spherical aberration are properly corrected.

The third lens L3 has negative refractive power, and the spherical aberration, the coma aberration, the astigmatism and the chromatic aberration are properly corrected by the aspheric surfaces on both sides. A shape of the third lens L3 is the meniscus shape having a concave surface facing the object side near the optical axis X. Therefore, the light ray incident angle to the third lens L3 can be appropriately controlled, and the coma aberration and the high-order spherical aberration are properly corrected.

The fourth lens L4 has the positive refractive power, and the astigmatism and the field curvature are properly corrected by the aspheric surfaces on both sides and the low-profileness and the wide field of view of the imaging lens are achieved. The fourth lens L4 has the biconvex shape having the convex surfaces facing the object side and the image side near the optical axis X, or the meniscus shape having the concave surface facing the object side near the optical axis X. In the Example 1 shown in FIG. 1, the Example 2 shown in FIG. 3, the Example 3 shown in FIG. 5, the Example 4 shown in FIG. 7, the Example 5 shown in FIG. 9 and the Example 6 shown in FIG. 11, the fourth lens L4 has the biconvex shape near the optical axis X. In this case, the positive refractive power is appropriately allocated to the object-side surface and the image-side surface. Therefore, the large positive refractive power can be provided while suppressing occurrence of the spherical aberration. As a result, the imaging lens can achieve further low-profileness and wide field of view. In the Example 7 shown in FIG. 13, the fourth lens L4 has the meniscus shape having the concave surface facing the object side near the optical axis X. In this case, the light ray incident angle to the fourth lens L4 can be appropriately controlled, and the coma aberration and the high-order spherical aberration are properly corrected.

The fifth lens L5 reduces burden on the sixth lens L6 which corrects the field curvature and the distortion and controls light ray incident angle to the image sensor, and also corrects chromatic aberration of magnification by the aspheric surfaces on the both sides. The fifth lens L5 has plane surfaces on both sides near the optical axis X, and is an aberration correction lens having no substantial refractive power near the optical axis X. Therefore, the aberrations can be properly corrected without affecting the focal length of the overall optical system or allocation of the refractive power of other lenses. The fifth lens L5 is not limited to the double-sided plane surface shape near the optical axis X. If effect on the focal length of the overall optical system or the refractive power of each lens is suppressed to small, various shapes may be applicable for the fifth lens L5, such as a meniscus shape having the convex surface facing the object side, a biconvex shape having the convex surfaces facing the object side and the image side, a meniscus shape having the concave surface facing the object side, a biconcave shape having the concave surfaces facing the object side and the image side, a shape having a plane surface facing the object side and a convex or a concave surface facing the image side, and a shape having the plane surface facing the image side and the convex or the concave surface facing the object side.

The sixth lens L6 has the concave surface facing the image side near the optical axis X and the negative refractive power, and secures back focus while maintaining the low-profileness. The refractive power of the sixth lens L6 may be the positive refractive power as shown in the Example 7 shown in FIG. 13. Furthermore, correction of the field curvature and the distortion, and control of light ray incident angle to the image sensor are made by the aspheric surfaces on the both sides. The image-side surface of the sixth lens L6 is the aspheric surface having a pole point and changes to the convex surface at an area apart from the optical axis X and maintains the convex shape until an edge of an effective diameter. By applying such aspheric surface, correction of the field curvature and control of light ray angle to an image sensor are facilitated.

In the imaging lens according to the present invention, an aperture stop ST is arranged on the object side of the first lens L1. By arranging the aperture stop ST closest to the object, a position of entrance pupil gets away from the image plane, and control of the light ray incident angle to the image sensor and telecentricity becomes facilitated.

Regarding the imaging lens according to the present embodiments, for example as shown in FIG. 1, all lenses of the first lens L1 to the sixth lens L6 are preferably single lenses which are not cemented each other. Configuration without the cemented lens can frequently use the aspheric surfaces, and proper correction of the aberrations can be realized. Furthermore, workload for cementing is reduced, and manufacturing in low cost becomes possible.

Regarding the imaging lens according to the present embodiments, a plastic material is used for all of the lenses, and manufacturing is facilitated and mass production in a low cost can be realized. Both-side surfaces of all lenses are appropriate aspheric, and the aberrations are favorably corrected.

The material applied to the lens is not limited to the plastic material. By using glass material, further high performance may be aimed. All of surfaces of lenses are preferably formed as aspheric surfaces, however, spherical surfaces may be adopted which is easy to manufacture in accordance with required performance.

The imaging lens according to the present embodiments shows preferable effect by satisfying the below conditional expressions (1) to (17).

$$1.5 < vd4/vd5 < 3.6 \tag{1}$$

$$0.30 < (T3/TTL) \times 100 < 0.85 \tag{2}$$

$$0.5 < vd1/(vd2+vd3) < 1.0 \tag{3}$$

$$1.35 < f1/f < 3.30 \tag{4}$$

$$0.8 < f2/f < 3.4 \tag{5}$$

$$-1.70 < f3/f < -0.65 \tag{6}$$

$$0.65 < f4/f < 2.10 \tag{7}$$

$$1.9 < |f6|/f \tag{8}$$

$$0.1 < D6/\Sigma D < 0.3 \tag{9}$$

$$0.7 < \Sigma(L1F-L6R)/f < 1.6 \tag{10}$$

$$0.1 < r5/r6 < 0.7 \tag{11}$$

$$0.20 < r11/f < 0.55 \tag{12}$$

$$0.15 < r12/f < 0.45 \tag{13}$$

$$Fno \leq 2.0 \tag{14}$$

$$0.6 < f2/f4 < 2.6 \tag{15}$$

$$0.60 < T3/T4 < 1.35 \tag{16}$$

$$5 < (D5/TTL) \times 100 < 12 \tag{17}$$

where
vd1: abbe number at d-ray of a first lens L1,
vd2: abbe number at d-ray of a second lens L2,
vd3: abbe number at d-ray of a third lens L3,
vd4: abbe number at d-ray of a fourth lens L4,
vd5: abbe number at d-ray of a fifth lens L5,
T3: distance along an optical axis from an image-side surface of the third lens L3 to an object-side surface of the fourth lens L4,
T4: distance along an optical axis from an image-side surface of the fourth lens L4 to an object-side surface of the fifth lens L5,
TTL: distance along an optical axis from an object-side surface of the first lens L1 to an image plane,
f: focal length of the overall optical system,
f1: focal length of the first lens L1,
f2: focal length of the second lens L2,
f3: focal length of the third lens L3,
f4: focal length of the fourth lens L4,
f6: focal length of the sixth lens L6,
D5: thickness on the optical axis of the fifth lens L5,
D6: thickness on the optical axis of the sixth lens L6,
ΣD: total sum of thickness on the optical axis X of the first lens L1, the second lens L2, the third lens L3, the fourth lens L4, the fifth lens L5 and the sixth lens L6, Σ(L1F−L6R): distance along the optical axis X from the object-side surface of the first lens L1 to the image-side surface of the sixth lens L6,
r5: paraxial curvature radius of the object-side surface of the third lens L3,
r6: paraxial curvature radius of the image-side surface of the third lens L3,
r11: paraxial curvature radius of the object-side surface of the sixth lens L6,
r12: paraxial curvature radius of the image-side surface of the sixth lens L6, and
Fno: F-number.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (17a).

$$1.85 < vd4/vd5 < 3.20 \tag{1a}$$

$$0.40 < (T3/TTL) \times 100 < 0.75 \tag{2a}$$

$$0.60 < vd1/(vd2+vd3) < 0.85 \tag{3a}$$

$$1.65 < f1/f < 2.90 \tag{4a}$$

$$1.00 < f2/f < 2.95 \tag{5a}$$

$$-1.5 < f3/f < -0.8 \tag{6a}$$

$$0.80 < f4/f < 1.85 \tag{7a}$$

$$2.4 < |f6|/f < 20.0 \tag{8a}$$

$$0.14 < D6/\Sigma D < 0.25 \tag{9a}$$

$$0.9 < \Sigma(L1F-L6R)/f < 1.4 \tag{10a}$$

$$0.13 < r5/r6 < 0.60 \tag{11a}$$

$$0.24 < r11/f < 0.45 \tag{12a}$$

$$0.20 < r12/f < 0.35 \tag{13a}$$

$$Fno \leq 1.9 \tag{14a}$$

$$0.75 < f2/f4 < 2.3 \tag{15a}$$

$$0.75 < T3/T4 < 1.20 \tag{16a}$$

$$6 < (D5/TTL) \times 100 < 10 \tag{17a}$$

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14, A16, A18 and A20 denote aspheric surface coefficients.

$$Z = \frac{\frac{H^2}{R}}{1+\sqrt{1-(k+1)\frac{H^2}{R^2}}} + A_4H^4 + A_6H^6 + A_8H^8 +$$
$$A_{10}H^{10} + A_{12}H^{12} + A_{14}H^{14} + A_{16}H^{16} + A_{18}H^{18} + A_{20}H^{20}$$

Equation 1

Next, examples of the imaging lens according to this embodiment will be explained. In each example, f denotes the focal length of the overall optical system of the imaging lens, Fno denotes an F-number, ω denotes a half field of view, and ih denotes a maximum image height. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

EXAMPLE 1

The basic lens data is shown below in Table 1.

TABLE 1

| Example 1 |
|---|
| Unit mm |

| f = 2.72 | ih = 3.26 |
|---|---|
| Fno = 1.8 | TTL = 4.11 |
| ω(°) = 50.1 | |

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.0510 | | |
| 2* | 2.2524 | 0.4131 | 1.544 | 55.86 (vd1) |
| 3* | 5.3692 | 0.1174 | | |
| 4* | 6.0879 | 0.4526 | 1.535 | 55.66 (vd2) |
| 5* | −2.3793 | 0.3515 | | |
| 6* | −0.7310 | 0.3300 | 1.661 | 20.37 (vd3) |
| 7* | −1.4661 | 0.0260 | | |
| 8* | 10.0989 | 0.3825 | 1.544 | 55.86 (vd4) |
| 9* | −2.3572 | 0.0300 | | |
| 10* | Infinity | 0.3600 | 1.614 | 25.58 (vd5) |
| 11* | Infinity | 0.0334 | | |
| 12* | 1.0843 | 0.4918 | 1.535 | 55.66 (vd6) |
| 13* | 0.8614 | 0.5000 | | |
| 14 | Infinity | 0.2100 | 1.517 | 64.20 |
| 15 | Infinity | 0.4818 | | |
| Image Plane | Infinity | | | |

Constituent Lens Data

| Lens | Start Surface | Focal Length |
|---|---|---|
| 1 | 2 | 6.810 |
| 2 | 4 | 3.259 |
| 3 | 6 | −2.686 |
| 4 | 8 | 3.550 |
| 5 | 10 | Infinity |
| 6 | 12 | −33.885 |

Aspheric Surface Data

| | Second Surface | Third Surface | Fourth Surface | Fifth Surface | Sixth Surface | Seventh Surface |
|---|---|---|---|---|---|---|
| k | −2.331179E+00 | 0.000000E+00 | −1.000000E+00 | −9.999999E−01 | −1.000000E+00 | 0.000000E+00 |
| A4 | −7.527715E−02 | −2.220918E−01 | −1.512366E−01 | −1.504052E−01 | 7.168343E−02 | −8.029630E−02 |
| A6 | 2.319407E−02 | −8.729089E−02 | −2.817847E−01 | 1.138025E−02 | −7.631071E−01 | −3.797023E−01 |
| A8 | −2.762643E−01 | −6.155922E−01 | −1.869433E−01 | −3.627602E−01 | 3.243245E+00 | 2.386234E+00 |
| A10 | 0.000000E+00 | 7.070838E−01 | −8.875539E−02 | −4.029084E−01 | −6.825057E+00 | −4.836478E+00 |
| A12 | 0.000000E+00 | 0.000000E+00 | 4.416396E−01 | 2.133227E+00 | 7.731701E+00 | 5.042076E+00 |
| A14 | 0.000000E+00 | 0.000000E+00 | 0.000000E+00 | −2.637456E+00 | −4.665493E+00 | −2.735304E+00 |
| A16 | 0.000000E+00 | 0.000000E+00 | 0.000000E+00 | 1.077927E+00 | 1.329231E+00 | 6.183892E−01 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | −1.186726E+01 | −5.494574E+00 | 0.000000E+00 | 0.000000E+00 | −1.749347E+00 | −6.224194E+00 |
| A4 | −5.858264E−01 | −1.765618E−01 | 8.845825E−01 | 1.230193E+00 | −1.898125E−01 | −2.683399E−02 |
| A6 | 1.714607E+00 | 8.112415E−01 | −1.924596E+00 | −2.751103E+00 | −8.109097E−03 | −9.674510E−02 |
| A8 | −2.741997E+00 | −1.751492E+00 | 2.291965E+00 | 3.353928E+00 | −1.072885E−01 | 9.456732E−02 |
| A10 | 2.709759E+00 | 2.347716E+00 | −1.836641E+00 | −2.645794E+00 | 2.127916E−01 | −4.148820E−02 |

TABLE 1-continued

| | | | Example 1 | | | |
|---|---|---|---|---|---|---|
| A12 | −1.725241E+00 | −1.916429E+00 | 1.045465E+00 | 1.383599E+00 | −1.392192E−01 | 1.029346E−02 |
| A14 | 6.799612E−01 | 9.003401E−01 | −4.350007E−01 | −4.715054E−01 | 4.558670E−02 | −1.491162E−03 |
| A16 | −1.588798E−01 | −2.213776E−01 | 1.248930E−01 | 9.966130E−02 | −8.140478E−03 | 1.162402E−04 |
| A18 | 1.837638E−02 | 2.196511E−02 | −2.120587E−02 | −1.178062E−02 | 7.602449E−04 | −3.548513E−06 |
| A20 | 0.000000E+00 | 0.000000E+00 | 1.550254E−03 | 5.927364E−04 | −2.916836E−05 | −2.250417E−08 |

The imaging lens in Example 1 satisfies conditional expressions (1) to (17) as shown in Table 8.

Figure 2:
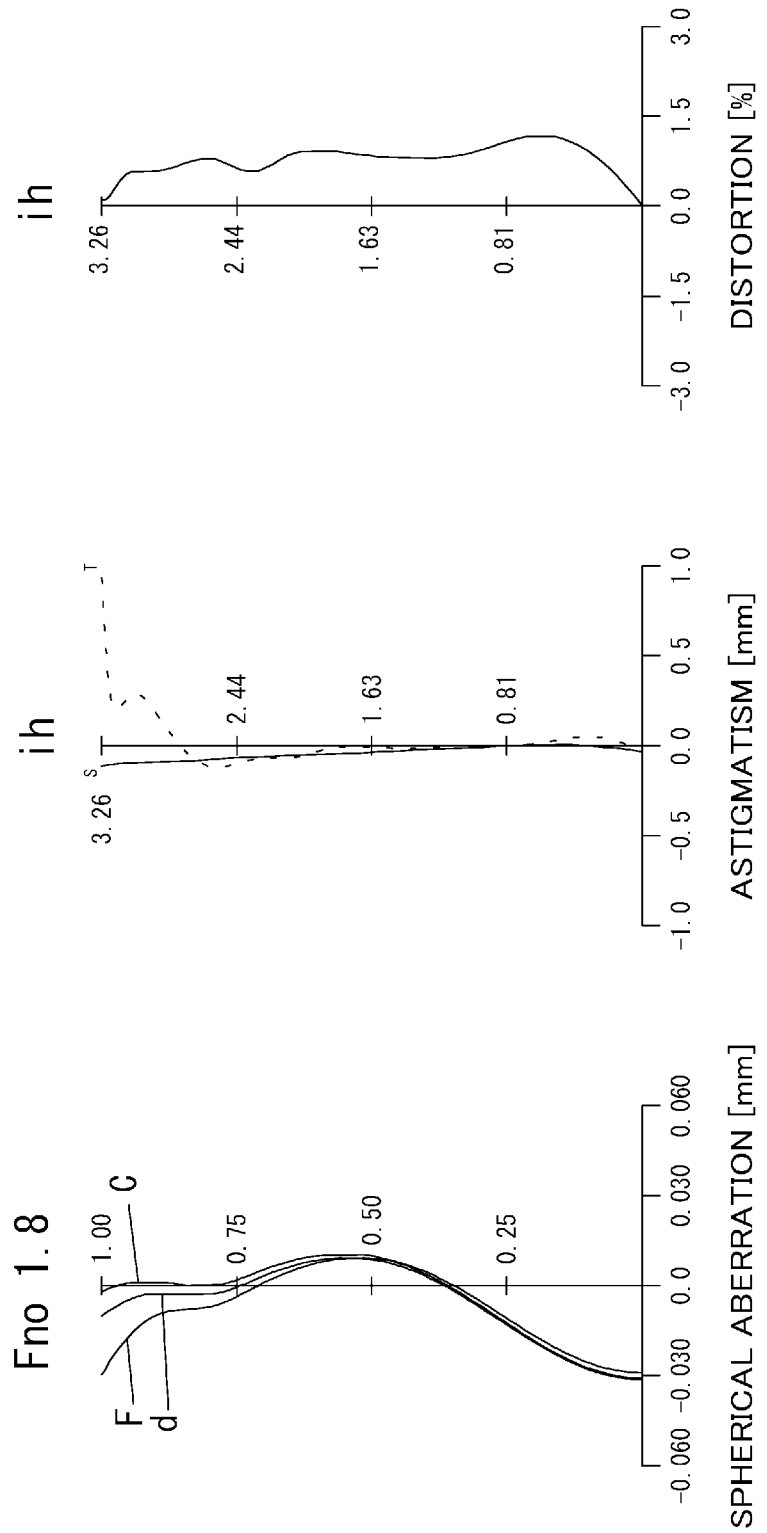
FIG. 2 shows spherical aberration, astigmatism, and distortion of the imaging lens in Example 1 according to the present invention.
Figure 3:
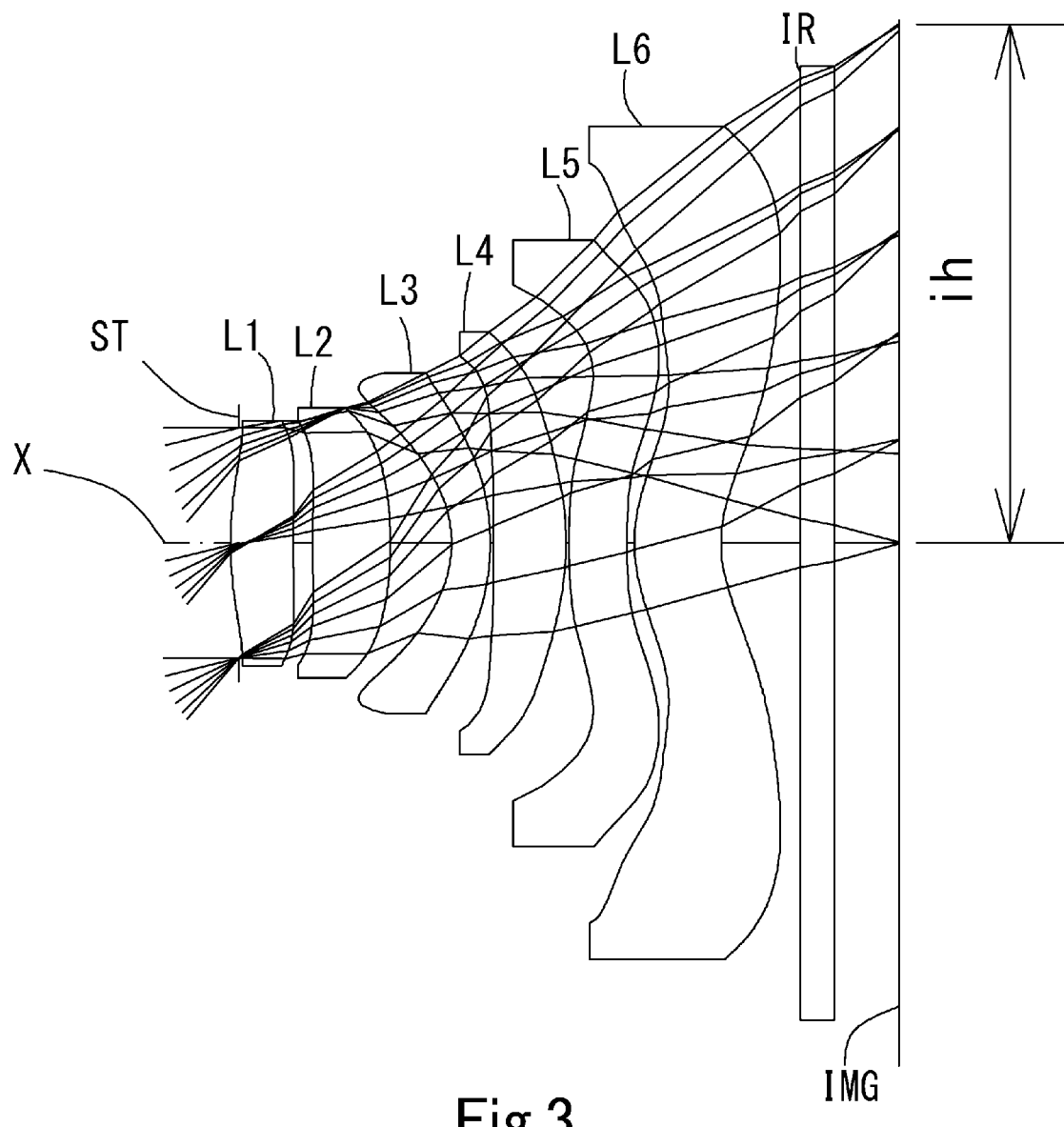
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S and on tangential image surface T, respectively (same as FIGS. 4, 6, 8, 10, 12 and 14). As shown in FIG. 2, each aberration is corrected excellently.

EXAMPLE 2

The basic lens data is shown below in Table 2.

TABLE 2

| | | Example 2 | | |
|---|---|---|---|---|
| | | Unit mm | | |
| | f = 2.66 | | ih = 3.26 | |
| | Fno = 1.8 | | TTL = 4.09 | |
| | ω(°) = 49.9 | | | |

| | | Surface Data | | |
|---|---|---|---|---|
| Surface Number i | Curvature Radius r | Surface Distance d | Refractive Index Nd | Abbe Number vd |
| (Object) | Infinity | Infinity | | |
| 1 (Stop) | Infinity | −0.0510 | | |
| 2* | 2.2559 | 0.3923 | 1.544 | 55.86 (vd1) |
| 3* | 6.3436 | 0.1209 | | |
| 4* | 9.5000 | 0.4886 | 1.535 | 55.66 (vd2) |
| 5* | −2.5193 | 0.3838 | | |
| 6* | −0.7424 | 0.2421 | 1.661 | 20.37 (vd3) |
| 7* | −1.5132 | 0.0200 | | |
| 8* | 12.0245 | 0.4556 | 1.544 | 55.86 (vd4) |
| 9* | −1.9696 | 0.0200 | | |
| 10* | Infinity | 0.3635 | 1.614 | 25.58 (vd5) |
| 11* | Infinity | 0.0451 | | |
| 12* | 1.0176 | 0.5421 | 1.535 | 55.66 (vd6) |
| 13* | 0.7909 | 0.5000 | | |
| 14 | Infinity | 0.2100 | 1.517 | 64.20 |
| 15 | Infinity | 0.3742 | | |
| Image Plane | Infinity | | | |

| | Constituent Lens Data | |
|---|---|---|
| Lens | Start Surface | Focal Length |
| 1 | 2 | 6.222 |
| 2 | 4 | 3.777 |
| 3 | 6 | −2.521 |
| 4 | 8 | 3.145 |
| 5 | 10 | Infinity |
| 6 | 12 | −39.776 |

| | | | Aspheric Surface Data | | | |
|---|---|---|---|---|---|---|
| | Second Surface | Third Surface | Fourth Surface | Fifth Surface | Sixth Surface | Seventh Surface |
| k | −2.695462E+00 | 0.000000E+00 | −3.119093E+01 | −1.335637E−01 | −9.278509E−01 | 0.000000E+00 |
| A4 | −7.527715E−02 | −2.220918E−01 | −1.512366E−01 | −1.504052E−01 | 7.168343E−02 | −8.029630E−02 |
| A6 | 2.319407E−02 | −8.729089E−02 | −2.817847E−01 | 1.138025E−02 | −7.631071E−01 | −3.797023E−01 |
| A8 | −2.762643E−01 | −6.155922E−01 | −1.869433E−01 | −3.627602E−01 | 3.243245E+00 | 2.386234E+00 |
| A10 | 0.000000E+00 | 7.070838E−01 | −8.875539E−02 | −4.029084E−01 | −6.825057E+00 | −4.836478E+00 |
| A12 | 0.000000E+00 | 0.000000E+00 | 4.416396E−01 | 2.133227E+00 | 7.731701E+00 | 5.042076E+00 |
| A14 | 0.000000E+00 | 0.000000E+00 | 0.000000E+00 | −2.637456E+00 | −4.665493E+00 | −2.735304E+00 |
| A16 | 0.000000E+00 | 0.000000E+00 | 0.000000E+00 | 1.077927E+00 | 1.329231E+00 | 6.183892E−01 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

TABLE 2-continued

Example 2

| | Eighth Surface | Ninth Surface | Tenth Surface | Eleventh Surface | Twelfth Surface | Thirteenth Surface |
|---|---|---|---|---|---|---|
| k | 9.780001E+01 | −3.361475E+00 | 0.000000E+00 | 0.000000E+00 | −1.804938E+00 | −4.974734E+00 |
| A4 | −5.779474E−01 | −1.493699E−01 | 9.373616E−01 | 1.235279E+00 | −1.996052E−01 | −2.768815E−02 |
| A6 | 1.778412E+00 | 7.726362E−01 | −1.985774E+00 | −2.741133E+00 | −1.225109E−02 | −9.625771E−02 |
| A8 | −3.077586E+00 | −1.755397E+00 | 2.356057E+00 | 3.329674E+00 | −1.069381E−01 | 9.673744E−02 |
| A10 | 3.239769E+00 | 2.345984E+00 | −1.898728E+00 | −2.635137E+00 | 2.133280E−01 | −4.256441E−02 |
| A12 | −2.138360E+00 | −1.914744E+00 | 1.074841E+00 | 1.382481E+00 | −1.392405E−01 | 1.040494E−02 |
| A14 | 7.708789E−01 | 9.001788E−01 | −4.374730E−01 | −4.716857E−01 | 4.556365E−02 | −1.474588E−03 |
| A16 | −1.003858E−01 | −2.228034E−01 | 1.215196E−01 | 9.969614E−02 | −8.139113E−03 | 1.151275E−04 |
| A18 | −9.792236E−03 | 2.278357E−02 | −1.973163E−02 | −1.178015E−02 | 7.604543E−04 | −4.077100E−06 |
| A20 | 0.000000E+00 | 0.000000E+00 | 1.335666E−03 | 5.924430E−04 | −2.917784E−05 | 2.624107E−08 |

The imaging lens in Example 2 satisfies conditional expressions (1) to (17) as shown in Table 8.

Figure 4:
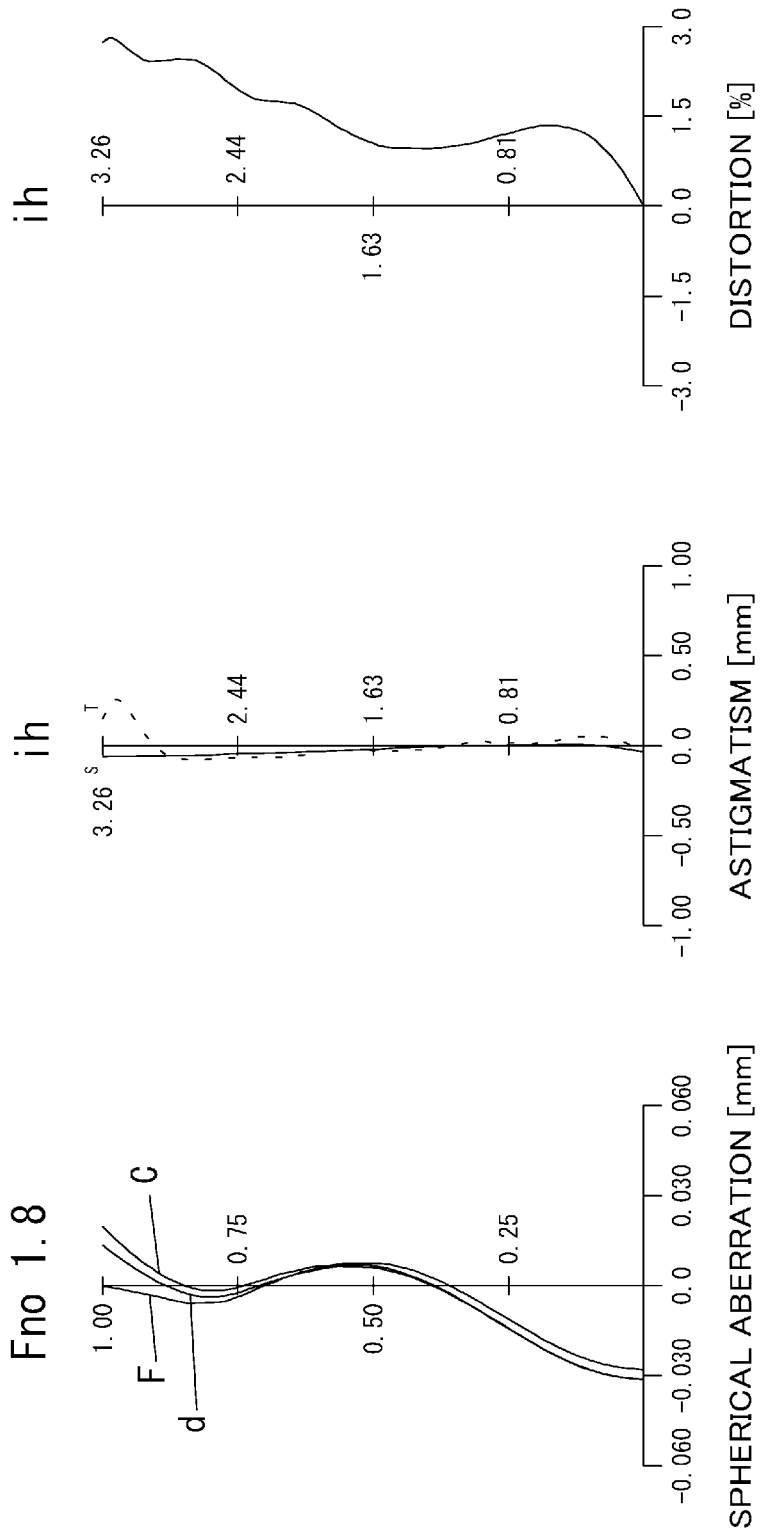
FIG. 4 shows spherical aberration, astigmatism, and distortion of the imaging lens in Example 2 according to the present invention.
Figure 5:
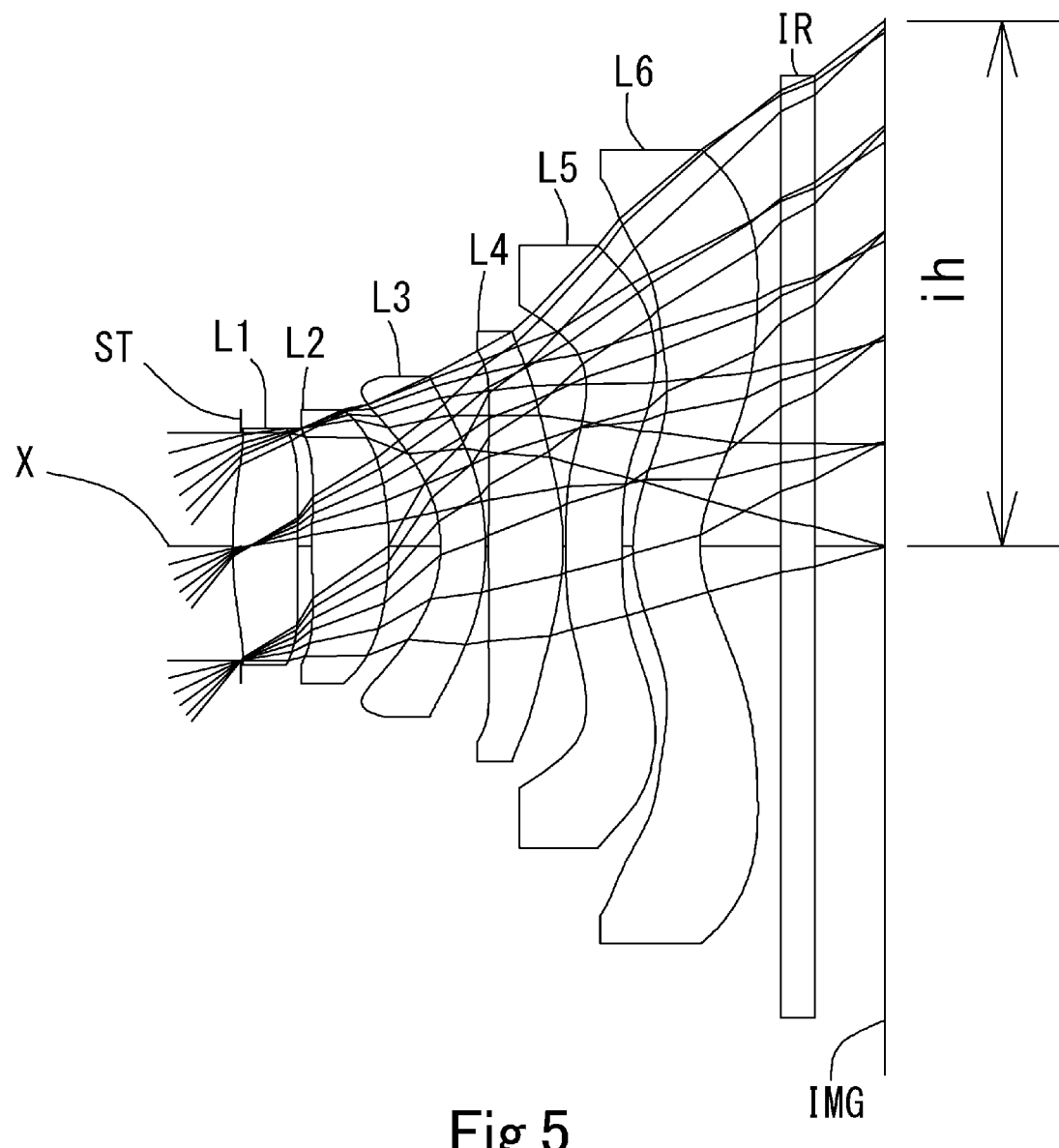
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

EXAMPLE 3

The basic lens data is shown below in Table 3.

TABLE 3

Example 3

Unit mm f = 2.59  ih = 3.26
Fno = 1.8  TTL = 3.94
ω(°) = 51.2

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.0510 | | |
| 2* | 2.4369 | 0.3986 | 1.544 | 55.86 (vd1) |
| 3* | 9.0000 | 0.0927 | | |
| 4* | 9.6512 | 0.4716 | 1.535 | 55.66 (vd2) |
| 5* | −2.5036 | 0.3223 | | |
| 6* | −0.8138 | 0.2759 | 1.661 | 20.37 (vd3) |
| 7* | −1.6670 | 0.0200 | | |
| 8* | 7.4351 | 0.4583 | 1.544 | 55.86 (vd4) |
| 9* | −1.7587 | 0.0200 | | |
| 10* | Infinity | 0.3458 | 1.614 | 25.58 (vd5) |
| 11* | Infinity | 0.0673 | | |
| 12* | 1.0121 | 0.4133 | 1.535 | 55.66 (vd6) |
| 13* | 0.6899 | 0.5000 | | |
| 14 | Infinity | 0.2100 | 1.517 | 64.20 |
| 15 | Infinity | 0.4145 | | |
| Image Plane | Infinity | | | |

Constituent Lens Data

| Lens | Start Surface | Focal Length |
|---|---|---|
| 1 | 2 | 6.011 |
| 2 | 4 | 3.768 |
| 3 | 6 | −2.762 |
| 4 | 8 | 2.660 |
| 5 | 10 | Infinity |
| 6 | 12 | −7.325 |

Aspheric Surface Data

| | Second Surface | Third Surface | Fourth Surface | Fifth Surface | Sixth Surface | Seventh Surface |
|---|---|---|---|---|---|---|
| k | −3.260016E+00 | 0.000000E+00 | −3.782225E+01 | −1.826789E+00 | −1.081000E+00 | 0.000000E+00 |
| A4 | −7.527715E−02 | −2.220918E−01 | −1.512366E−01 | −1.504052E−01 | 7.168343E−02 | −8.029630E−02 |
| A6 | 2.319407E−02 | −8.729089E−02 | −2.817847E−01 | 1.138025E−02 | −7.631071E−01 | −3.797023E−01 |
| A8 | −2.762643E−01 | −6.155922E−01 | −1.869433E−01 | −3.627602E−01 | 3.243245E+00 | 2.386234E+00 |

TABLE 3-continued

Example 3

| | | | | | | |
|---|---|---|---|---|---|---|
| A10 | 0.000000E+00 | 7.070838E−01 | −8.875539E−02 | −4.029084E−01 | −6.825057E+00 | −4.836478E+00 |
| A12 | 0.000000E+00 | 0.000000E+00 | 4.416396E−01 | 2.133227E+00 | 7.731701E+00 | 5.042076E+00 |
| A14 | 0.000000E+00 | 0.000000E+00 | 0.000000E+00 | −2.637456E+00 | −4.665493E+00 | −2.735304E+00 |
| A16 | 0.000000E+00 | 0.000000E+00 | 0.000000E+00 | 1.077927E+00 | 1.329231E+00 | 6.183892E−01 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 3.262137E+01 | −6.046067E+00 | 0.000000E+00 | 0.000000E+00 | −1.761221E+00 | −4.174866E+00 |
| A4 | −5.161471E−01 | −1.232851E−01 | 8.568401E−01 | 1.246105E+00 | −2.136159E−01 | −6.128761E−02 |
| A6 | 1.553392E+00 | 7.682042E−01 | −1.716235E+00 | −2.748763E+00 | −4.537272E−03 | −8.416284E−02 |
| A8 | −2.600186E+00 | −1.723019E+00 | 1.863763E+00 | 3.331651E+00 | −1.109148E−01 | 9.542871E−02 |
| A10 | 2.835580E+00 | 2.275904E+00 | −1.443339E+00 | −2.638124E+00 | 2.149159E−01 | −4.285154E−02 |
| A12 | −2.213846E+00 | −1.864006E+00 | 8.795010E−01 | 1.384832E+00 | −1.394310E−01 | 1.048277E−02 |
| A14 | 1.186491E+00 | 8.995568E−01 | −4.454881E−01 | −4.721943E−01 | 4.553733E−02 | −1.476898E−03 |
| A16 | −3.846535E−01 | −2.312642E−01 | 1.634907E−01 | 9.966285E−02 | −8.137865E−03 | 1.140672E−04 |
| A18 | 5.504336E−02 | 2.441071E−02 | −3.454872E−02 | −1.175873E−02 | 7.620464E−04 | −3.944055E−06 |
| A20 | 0.000000E+00 | 0.000000E+00 | 3.003970E−03 | 5.906561E−04 | −2.935038E−05 | 2.110647E−08 |

The imaging lens in Example 3 satisfies conditional expressions (1) to (17) as shown in Table 8.

Figure 6:
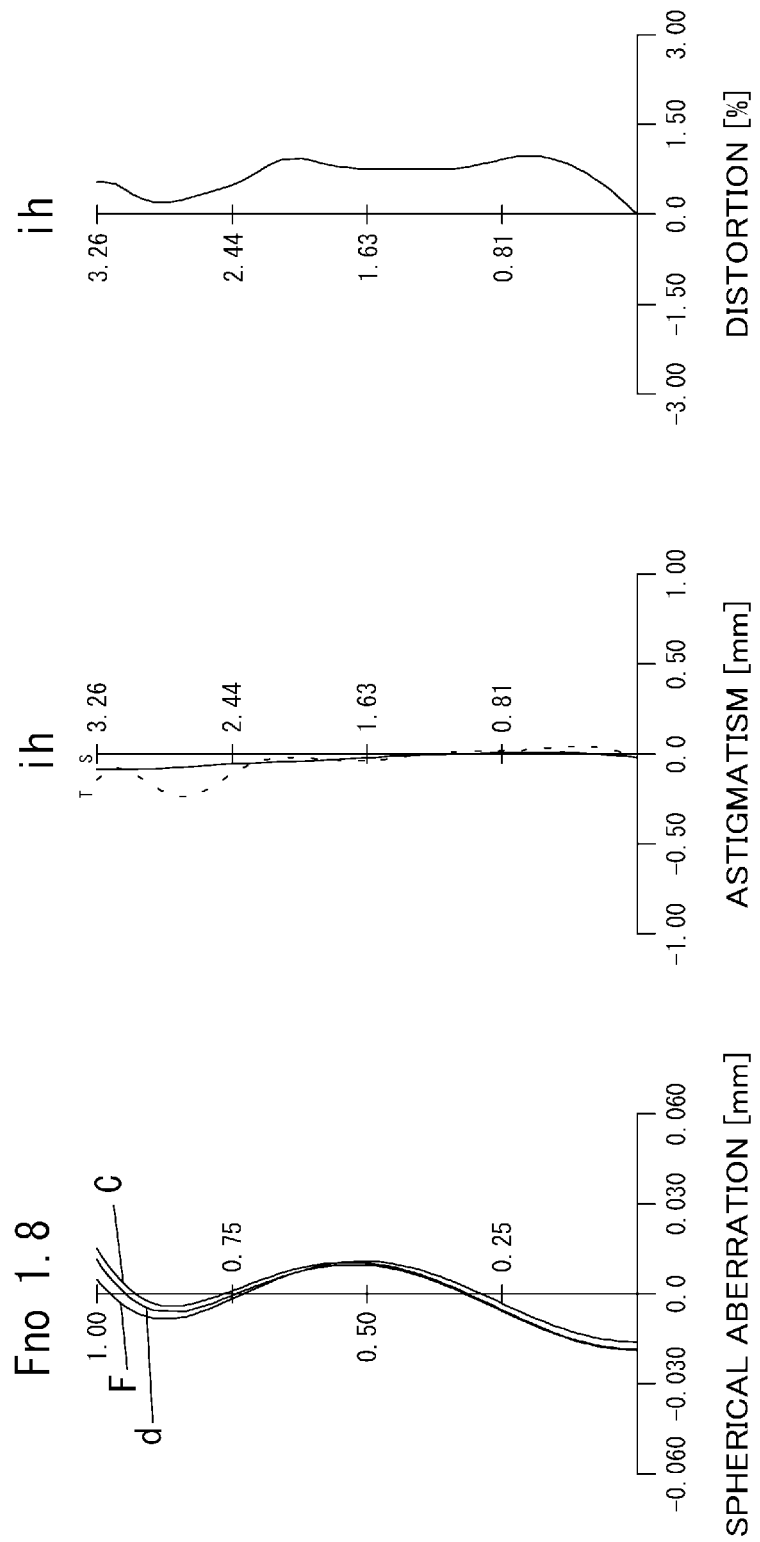
FIG. 6 shows spherical aberration, astigmatism, and distortion of the imaging lens in Example 3 according to the present invention.
Figure 7:
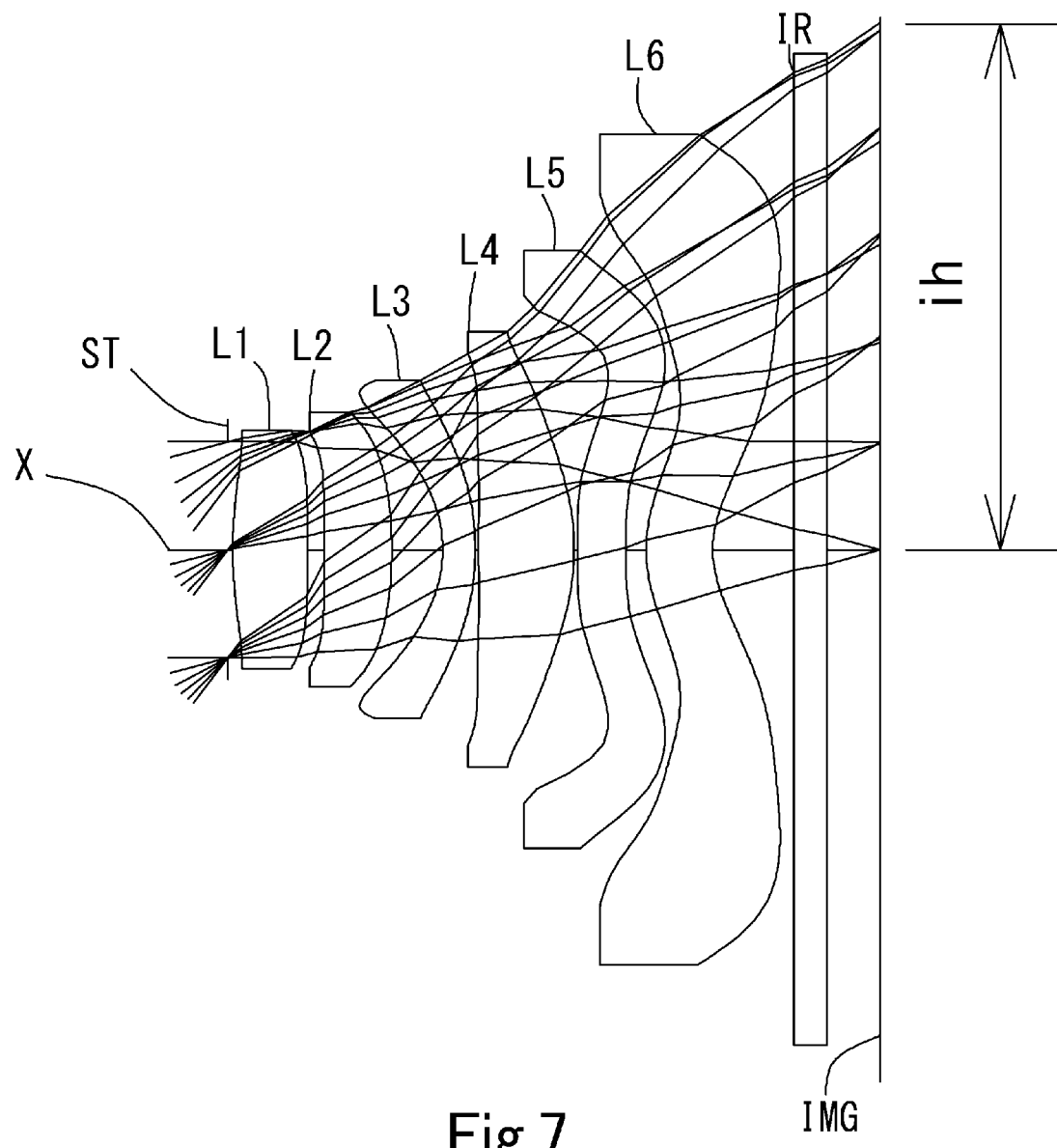
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

EXAMPLE 4

The basic lens data is shown below in Table 4.

TABLE 4

Example 4

Unit mm f = 2.47  ih = 3.26
Fno = 1.8  TTL = 3.91
ω(°) = 52.5

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | 0.0300 | | |
| 2* | 2.6539 | 0.4608 | 1.544 | 55.86 (vd1) |
| 3* | −500.3507 | 0.1044 | | |
| 4* | 100.0701 | 0.4194 | 1.535 | 55.66 (vd2) |
| 5* | −2.4843 | 0.3152 | | |
| 6* | −0.7912 | 0.2001 | 1.661 | 20.37 (vd3) |
| 7* | −1.6698 | 0.0200 | | |
| 8* | 8.3903 | 0.5924 | 1.544 | 55.86 (vd4) |
| 9* | −1.4881 | 0.0200 | | |
| 10* | Infinity | 0.3013 | 1.614 | 25.58 (vd5) |
| 11* | Infinity | 0.1237 | | |
| 12* | 0.9144 | 0.4126 | 1.535 | 55.66 (vd6) |
| 13* | 0.6290 | 0.5000 | | |
| 14 | Infinity | 0.2100 | 1.517 | 64.20 |
| 15 | Infinity | 0.3059 | | |
| Image Plane | Infinity | | | |

Constituent Lens Data

| Lens | Start Surface | Focal Length |
|---|---|---|
| 1 | 2 | 4.852 |
| 2 | 4 | 4.539 |
| 3 | 6 | −2.503 |
| 4 | 8 | 2.372 |
| 5 | 10 | Infinity |
| 6 | 12 | −7.597 |

TABLE 4-continued

Example 4

Aspheric Surface Data

|   | Second Surface | Third Surface | Fourth Surface | Fifth Surface | Sixth Surface | Seventh Surface |
|---|---|---|---|---|---|---|
| k   | −2.632580E+00 | 0.000000E+00 | 0.000000E+00 | −7.917237E+00 | −1.045405E+00 | 0.000000E+00 |
| A4  | −7.511897E−02 | −2.216251E−01 | −1.509188E−01 | −1.500892E−01 | 7.153280E−02 | −8.012757E−02 |
| A6  | 2.311290E−02 | −8.698540E−02 | −2.807985E−01 | 1.134042E−02 | −7.604364E−01 | −3.783734E−01 |
| A8  | −2.749116E−01 | −6.125782E−02 | −1.860280E−01 | −3.609841E−01 | 3.227366E+00 | 2.374550E+00 |
| A10 | 0.000000E+00 | 7.026358E−01 | −8.819706E−02 | −4.003738E−01 | −6.782123E+00 | −4.806053E+00 |
| A12 | 0.000000E+00 | 0.000000E+00 | 4.382463E−01 | 2.116837E+00 | 7.672297E+00 | 5.003336E+00 |
| A14 | 0.000000E+00 | 0.000000E+00 | 0.000000E+00 | −2.613524E+00 | −4.623159E+00 | −2.710484E+00 |
| A16 | 0.000000E+00 | 0.000000E+00 | 0.000000E+00 | 1.066649E+00 | 1.315324E+00 | 6.119193E−01 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

|   | Eighth Surface | Ninth Surface | Tenth Surface | Eleventh Surface | Twelfth Surface | Thirteenth Surface |
|---|---|---|---|---|---|---|
| k   | 4.042719E+01 | −3.636609E+00 | 0.000000E+00 | 0.000000E+00 | −1.929494E+00 | −3.388291E+00 |
| A4  | −4.933426E−01 | −1.337301E−01 | 9.546355E−01 | 1.293156E+00 | −2.437873E−01 | −9.762711E−02 |
| A6  | 1.439113E+00 | 7.387064E−01 | −1.772673E+00 | −2.747973E+00 | 3.950192E−03 | −6.599258E−02 |
| A8  | −2.452508E+00 | −1.708771E+00 | 1.904511E+00 | 3.308634E+00 | −1.120200E−01 | 9.399156E−02 |
| A10 | 2.779103E+00 | 2.303112E+00 | −1.488840E+00 | −2.632469E+00 | 2.153171E−01 | −4.434269E−02 |
| A12 | −2.202493E+00 | −1.886041E+00 | 9.071041E−01 | 1.385081E+00 | −1.396150E−01 | 1.109211E−02 |
| A14 | 1.141336E+00 | 9.077591E−01 | −4.495010E−01 | −4.722948E−01 | 4.556846E−02 | −1.582081E−03 |
| A16 | −3.382970E−01 | −2.354152E−01 | 1.624357E−01 | 9.964229E−02 | −8.139940E−03 | 1.226534E−04 |
| A18 | 4.202373E−02 | 2.562746E−02 | −3.582932E−02 | −1.174936E−02 | 7.625235E−04 | −4.218023E−06 |
| A20 | 0.000000E+00 | 0.000000E+00 | 3.578610E−03 | 5.893388E−04 | −2.941679E−05 | 2.268033E−08 |

The imaging lens in Example 4 satisfies conditional expressions (1) to (17) as shown in Table 8.

Figure 8:
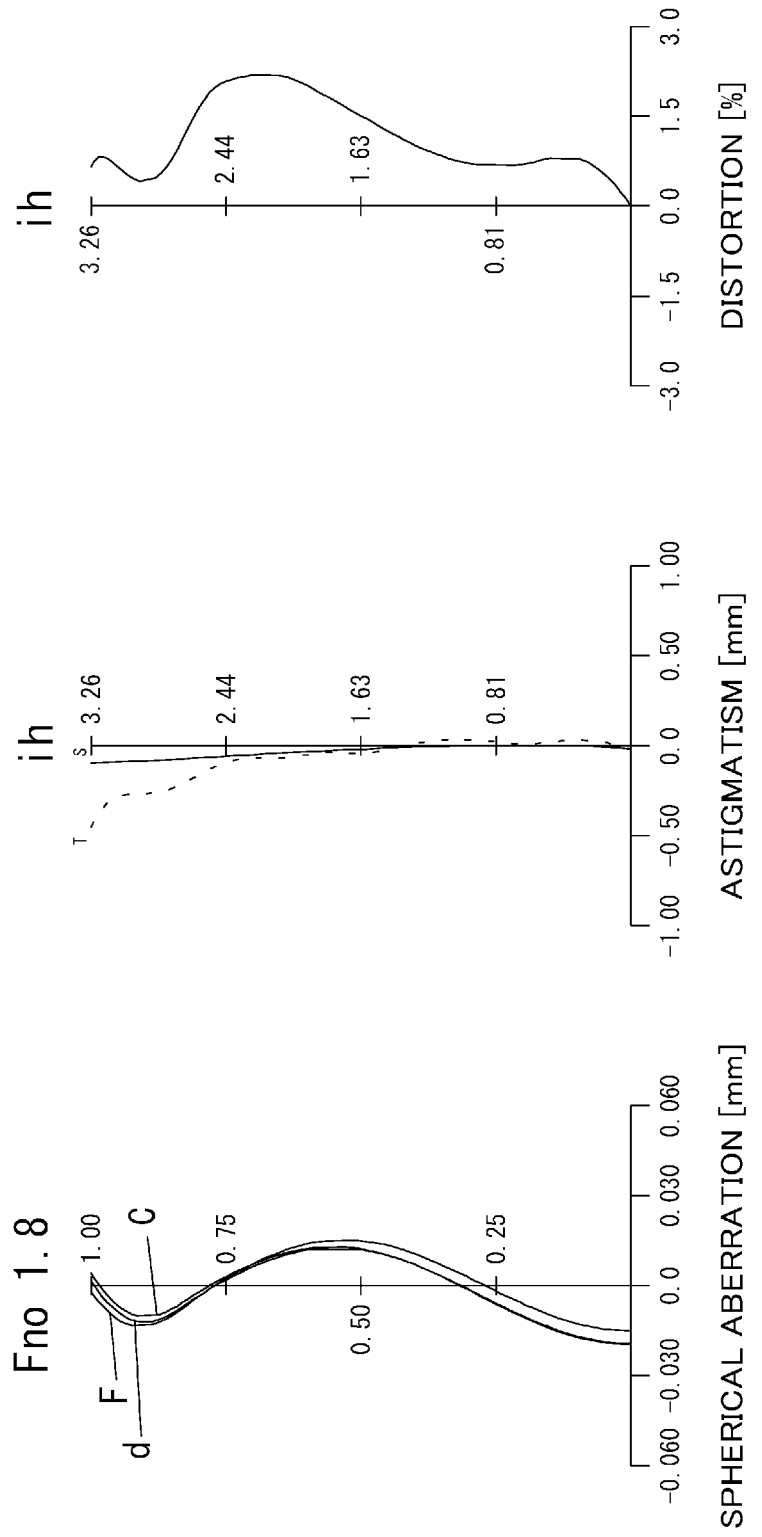
FIG. 8 shows spherical aberration, astigmatism, and distortion of the imaging lens in Example 4 according to the present invention.
Figure 9:
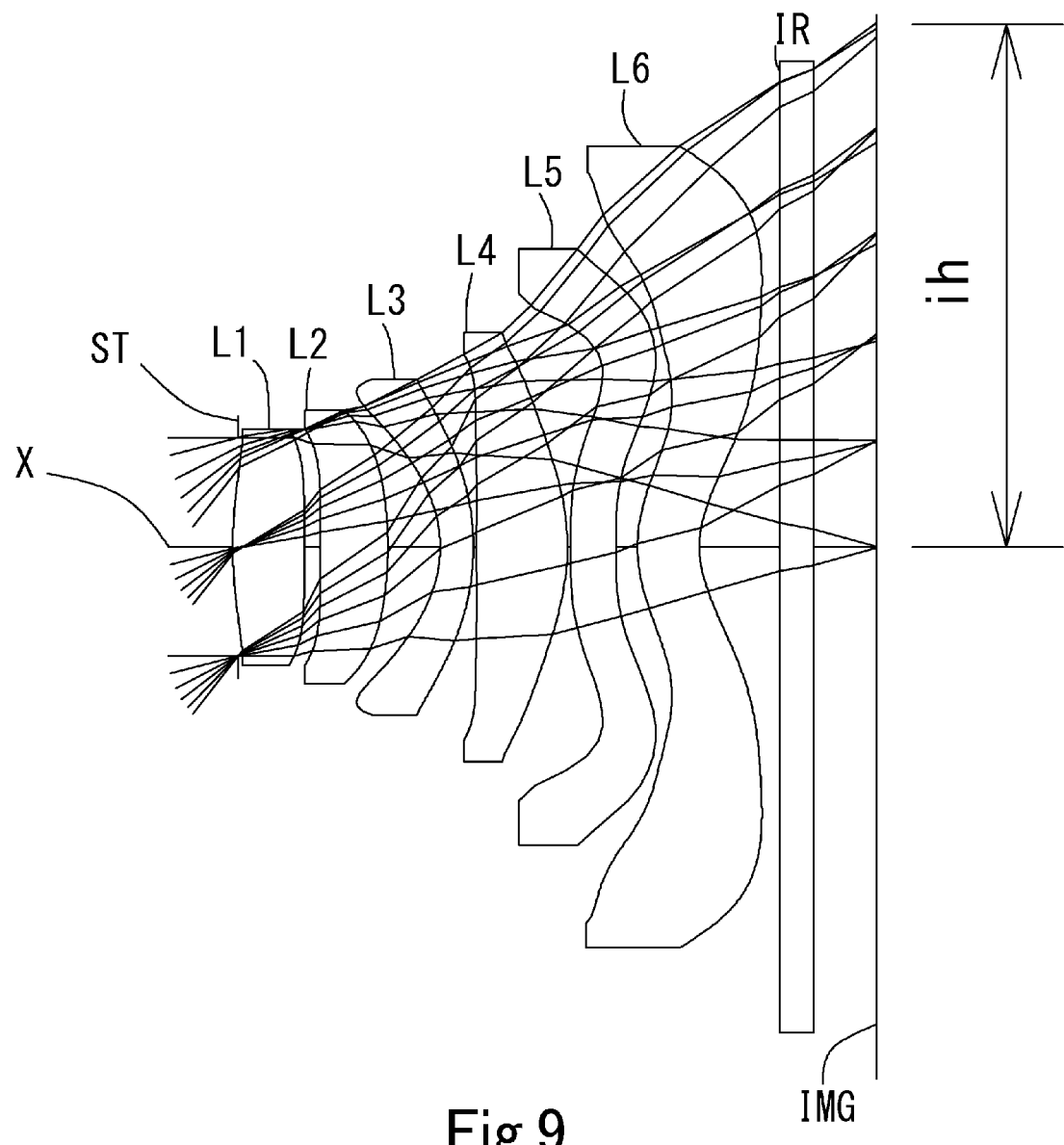
FIG. 9 is a schematic view showing a general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

EXAMPLE 5

The basic lens data is shown below in Table 5.

TABLE 5

Example 5

Unit mm f = 2.49  ih = 3.26
Fno = 1.8  TTL = 3.91
ω(°) = 52.1

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.0300 | | |
| 2* | 2.6123 | 0.4432 | 1.544 | 55.86 (vd1) |
| 3* | 59.9999 | 0.1006 | | |
| 4* | −5999.9940 | 0.4177 | 1.535 | 55.66 (vd2) |
| 5* | −2.3939 | 0.3248 | | |
| 6* | −0.7724 | 0.2050 | 1.661 | 20.37 (vd3) |
| 7* | −1.6285 | 0.0200 | | |
| 8* | 8.1679 | 0.5640 | 1.544 | 55.86 (vd4) |
| 9* | −1.4563 | 0.0200 | | |
| 10* | Infinity | 0.2820 | 1.614 | 25.58 (vd5) |
| 11* | Infinity | 0.1322 | | |
| 12* | 0.8988 | 0.3839 | 1.535 | 55.66 (vd6) |
| 13* | 0.6285 | 0.5000 | | |
| 14 | Infinity | 0.2100 | 1.517 | 64.20 |
| 15 | Infinity | 0.3734 | | |
| Image Plane | Infinity | | | |

TABLE 5-continued

Example 5

Constituent Lens Data

| Lens | Start Surface | Focal Length |
|---|---|---|
| 1 | 2 | 5.004 |
| 2 | 4 | 4.478 |
| 3 | 6 | -2.458 |
| 4 | 8 | 2.319 |
| 5 | 10 | Infinity |
| 6 | 12 | -7.741 |

Aspheric Surface Data

| | Second Surface | Third Surface | Fourth Surface | Fifth Surface | Sixth Surface | Seventh Surface |
|---|---|---|---|---|---|---|
| k   | -3.702824E+00 | 0.000000E+00  | 0.000000E+00  | -6.448212E+00 | -1.080022E+00 | 0.000000E+00 |
| A4  | -7.527738E-02 | -2.220925E-01 | -1.512371E-01 | -1.504057E-01 | 7.168365E-02  | -8.029654E-02 |
| A6  | 2.319419E-02  | -8.729133E-02 | -2.817861E-01 | 1.138030E-02  | -7.631109E-01 | -3.797042E-01 |
| A8  | -2.762662E-01 | -6.155966E-01 | -1.869446E-01 | -3.627628E-01 | 3.243268E+00  | 2.386251E+00 |
| A10 | 0.000000E+00  | 7.070902E-01  | -8.875619E-02 | -4.029120E-01 | -6.825119E+00 | -4.836522E+00 |
| A12 | 0.000000E+00  | 0.000000E+00  | 4.416444E-01  | 2.133251E+00  | 7.731786E+00  | 5.042131E+00 |
| A14 | 0.000000E+00  | 0.000000E+00  | 0.000000E+00  | -2.637490E+00 | -4.665554E+00 | -2.735339E+00 |
| A16 | 0.000000E+00  | 0.000000E+00  | 0.000000E+00  | 1.077943E+00  | 1.329251E+00  | 6.183985E-01 |
| A18 | 0.000000E+00  | 0.000000E+00  | 0.000000E+00  | 0.000000E+00  | 0.000000E+00  | 0.000000E+00 |
| A20 | 0.000000E+00  | 0.000000E+00  | 0.000000E+00  | 0.000000E+00  | 0.000000E+00  | 0.000000E+00 |

| | Eighth Surface | Ninth Surface | Tenth Surface | Eleventh Surface | Twelfth Surface | Thirteenth Surface |
|---|---|---|---|---|---|---|
| k   | 3.367314E+01  | -3.768192E+00 | 0.000000E+00  | 0.000000E+00  | -1.948663E+00 | -3.298325E+00 |
| A4  | -5.004754E-01 | -1.192848E-01 | 9.830686E-01  | 1.299255E+00  | -2.452653E-01 | -1.107272E-01 |
| A6  | 1.469749E+00  | 7.226936E-01  | -1.835626E+00 | -2.757331E+00 | 4.277730E-01  | -5.860955E-02 |
| A8  | -2.524711E+00 | -1.682018E+00 | 1.989508E+00  | 3.316366E+00  | -1.101479E-01 | 9.126892E-02 |
| A10 | 2.871435E+00  | 2.267117E+00  | -1.557904E+00 | -2.634591E+00 | 2.144441E-01  | -4.380031E-02 |
| A12 | -2.265235E+00 | -1.858146E+00 | 9.354133E-01  | 1.384890E+00  | -1.394668E-01 | 1.104958E-02 |
| A14 | 1.163429E+00  | 8.997934E-01  | -4.490824E-01 | -4.721300E-01 | 4.555141E-02  | -1.584185E-03 |
| A16 | -3.441692E-01 | -2.379676E-01 | 1.579797E-01  | 9.967033E-02  | -8.135783E-03 | 1.225808E-04 |
| A18 | 4.340716E-02  | 2.701494E-02  | -3.449233E-02 | -1.177166E-02 | 7.616982E-04  | -4.090529E-06 |
| A20 | 0.000000E+00  | 0.000000E+00  | 3.448965E-03  | 5.920393E-04  | -2.935678E-05 | 1.337399E-08 |

The imaging lens in Example 5 satisfies conditional expressions (1) to (17) as shown in Table 8.

Figure 10:
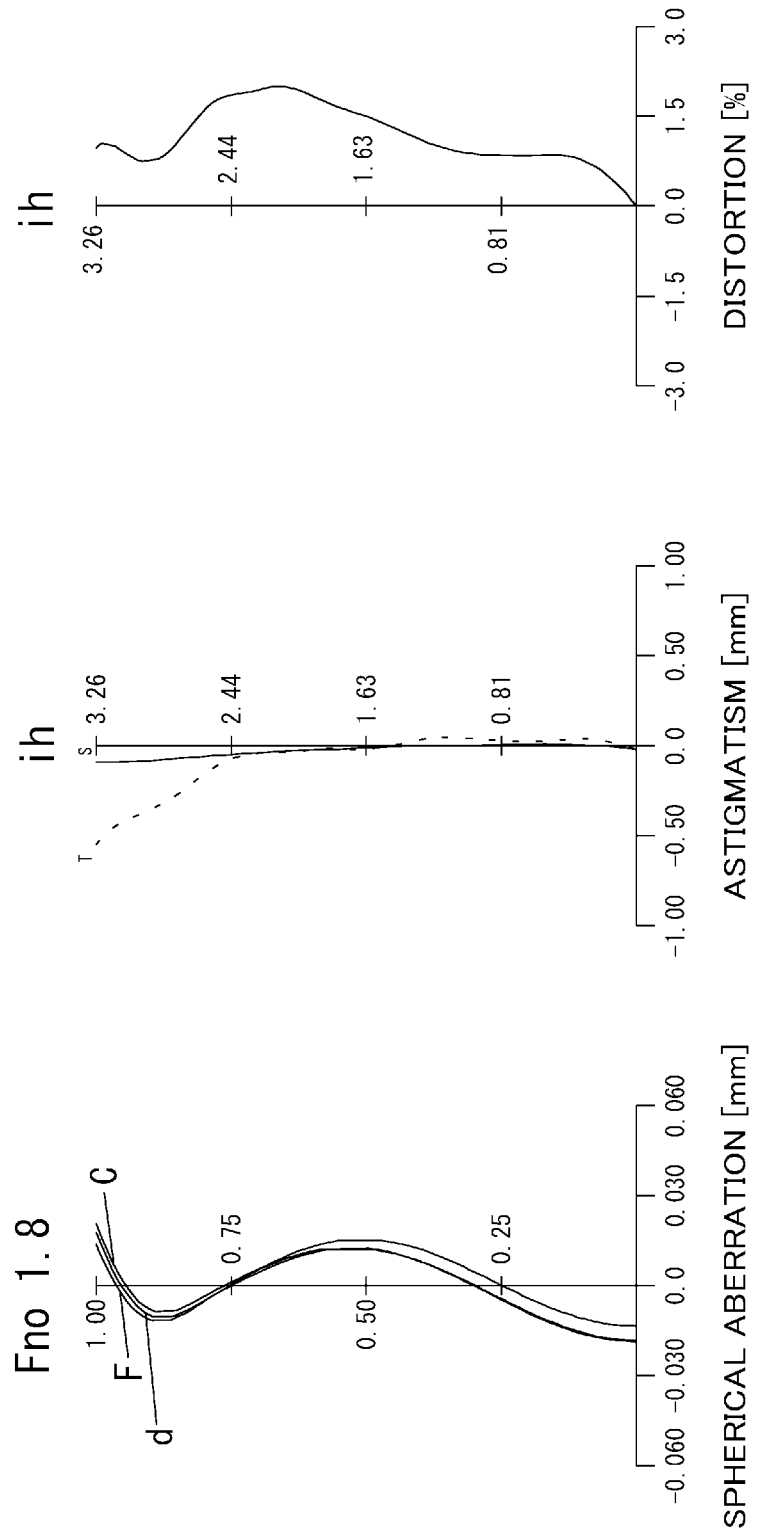
FIG. 10 shows spherical aberration, astigmatism, and distortion of the imaging lens in Example 5 according to the present invention.
Figure 11:
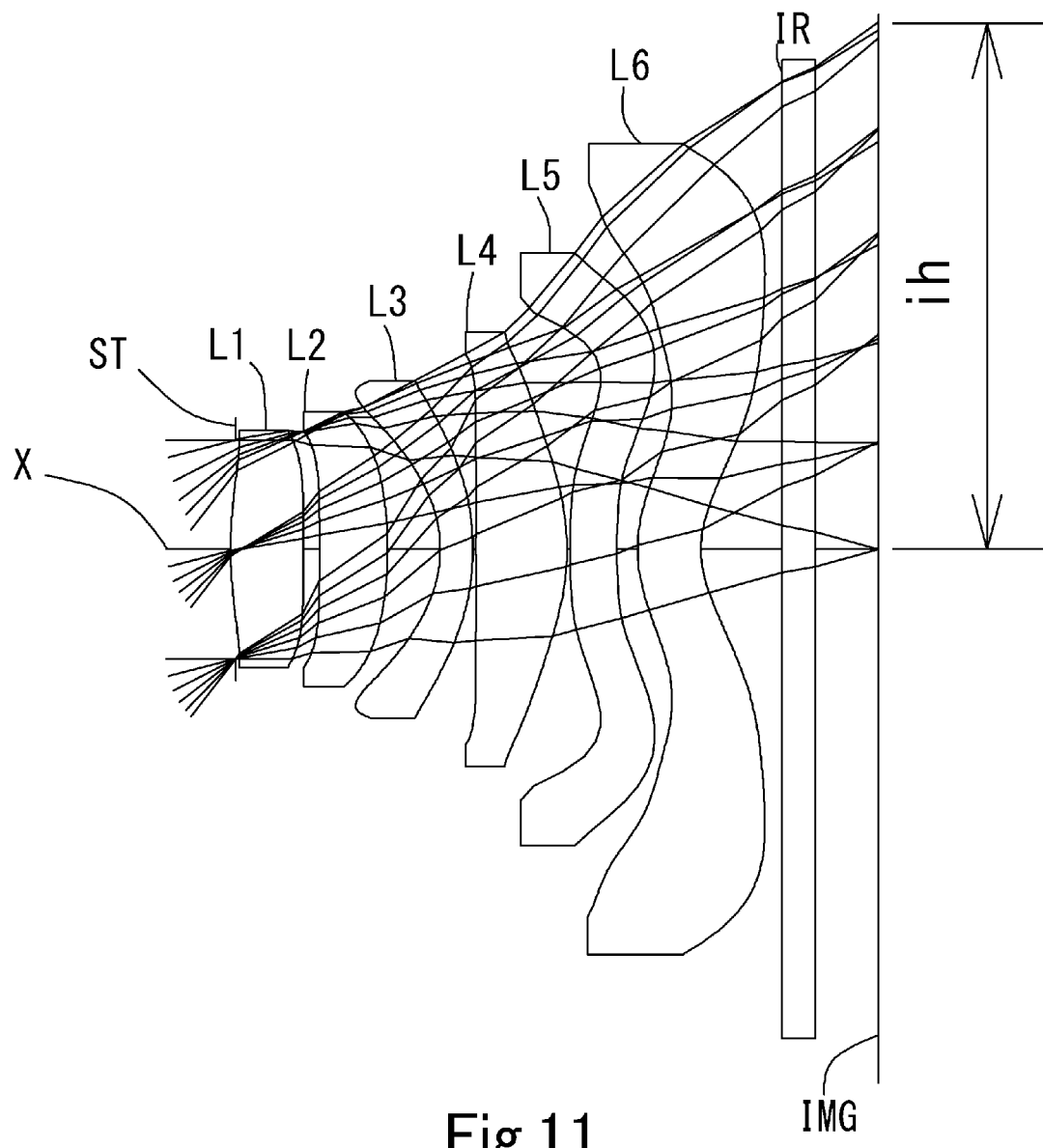
FIG. 11 is a schematic view showing the general configuration of an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

EXAMPLE 6

The basic lens data is shown below in Table 6.

TABLE 6

Example 6

Unit mm f = 2.50  ih = 3.26
Fno = 1.8  TTL = 3.92
ω(°) = 52.3

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | -0.0300 | | |
| 2* | 2.6952 | 0.4499 | 1.544 | 55.86 (vd1) |
| 3* | -500.0000 | 0.0992 | | |
| 4* | -236.5491 | 0.4213 | 1.535 | 55.66 (vd2) |
| 5* | -2.4152 | 0.3264 | | |
| 6* | -0.7681 | 0.2000 | 1.661 | 20.37 (vd3) |
| 7* | -1.6067 | 0.0200 | | |
| 8* | 7.8466 | 0.5631 | 1.544 | 55.86 (vd4) |

TABLE 6-continued

Example 6

| | | | | | |
|---|---|---|---|---|---|
| 9* | −1.4775 | 0.0200 | | | |
| 10* | Infinity | 0.2889 | | 1.614 | 25.58 (vd5) |
| 11* | Infinity | 0.1274 | | | |
| 12* | 0.9109 | 0.3914 | | 1.535 | 55.66 (vd6) |
| 13* | 0.6369 | 0.5000 | | | |
| 14 | Infinity | 0.2100 | | 1.517 | 64.20 |
| 15 | Infinity | 0.3697 | | | |
| Image Plane | Infinity | | | | |

Constituent Lens Data

| Lens | Start Surface | Focal Length |
|---|---|---|
| 1 | 2 | 4.927 |
| 2 | 4 | 4.560 |
| 3 | 6 | −2.461 |
| 4 | 8 | 2.334 |
| 5 | 10 | Infinity |
| 6 | 12 | −7.879 |

Aspheric Surface Data

| | Second Surface | Third Surface | Fourth Surface | Fifth Surface | Sixth Surface | Seventh Surface |
|---|---|---|---|---|---|---|
| k | −4.497389E+00 | 0.000000E+00 | 0.000000E+00 | −6.219467E+00 | −1.064692E+00 | 0.000000E+00 |
| A4 | −7.527715E−02 | −2.220918E−01 | −1.512366E−01 | −1.504052E−01 | 7.168343E−02 | −8.029630E−02 |
| A6 | 2.319407E−02 | −8.729089E−02 | −2.817847E−01 | 1.138025E−02 | −7.631071E−01 | −3.797023E−01 |
| A8 | −2.762643E−01 | −6.155922E−01 | −1.869433E−01 | −3.627602E+00 | 3.243245E+00 | 2.386234E+00 |
| A10 | 0.000000E+00 | 7.070838E−01 | −8.875539E−02 | −4.029084E−01 | −6.825057E+00 | −4.836478E+00 |
| A12 | 0.000000E+00 | 0.000000E+00 | 4.416396E−01 | 2.133227E+00 | 7.731701E+00 | 5.042076E+00 |
| A14 | 0.000000E+00 | 0.000000E+00 | 0.000000E+00 | −2.637456E+00 | −4.665493E+00 | −2.735304E+00 |
| A16 | 0.000000E+00 | 0.000000E+00 | 0.000000E+00 | 1.077927E+00 | 1.329231E+00 | 6.183892E−01 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Twelfth Surface | Eleventh Surface | Thirteenth Surface |
|---|---|---|---|---|---|---|
| k | 3.360683E+01 | −3.721259E+00 | 0.000000E+00 | 0.000000E+00 | −1.879843E+00 | −3.336148E+00 |
| A4 | −5.054708E−01 | −1.270644E+00 | 9.605790E−01 | 1.288821E+00 | −2.477514E−01 | −1.049799E−01 |
| A6 | 1.483371E+00 | 7.519021E−01 | −1.791143E+00 | −2.753188E+00 | 5.308238E−03 | −6.111112E−02 |
| A8 | −2.528776E+00 | −1.705370E+00 | 1.923993E+00 | 3.316318E+00 | −1.109453E−01 | 9.174578E−02 |
| A10 | 2.872815E+00 | 2.277352E+00 | −1.501562E+00 | −2.635934E+00 | 2.145576E−01 | −4.378499E−02 |
| A12 | −2.285687E+00 | −1.864225E+00 | 9.104191E−01 | 1.385387E+00 | −1.394541E−01 | 1.103457E−02 |
| A14 | 1.185696E+00 | 8.981698E−01 | −4.468369E−01 | −4.721697E−01 | 4.555319E−02 | −1.582184E−03 |
| A16 | −3.492906E−01 | −2.325064E−01 | 1.593117E−01 | 9.963342E−02 | −8.136690E−03 | 1.219252E−04 |
| A18 | 4.255337E−02 | 2.514587E−02 | −3.468565E−02 | −1.175503E−02 | 7.617190E−04 | −3.933179E−06 |
| A20 | 0.000000E+00 | 0.000000E+00 | 3.449503E−03 | 5.896842E−04 | −2.935663E−05 | 1.801413E−09 |

The imaging lens in Example 6 satisfies conditional expressions (1) to (17) as shown in Table 8.

Figure 12:
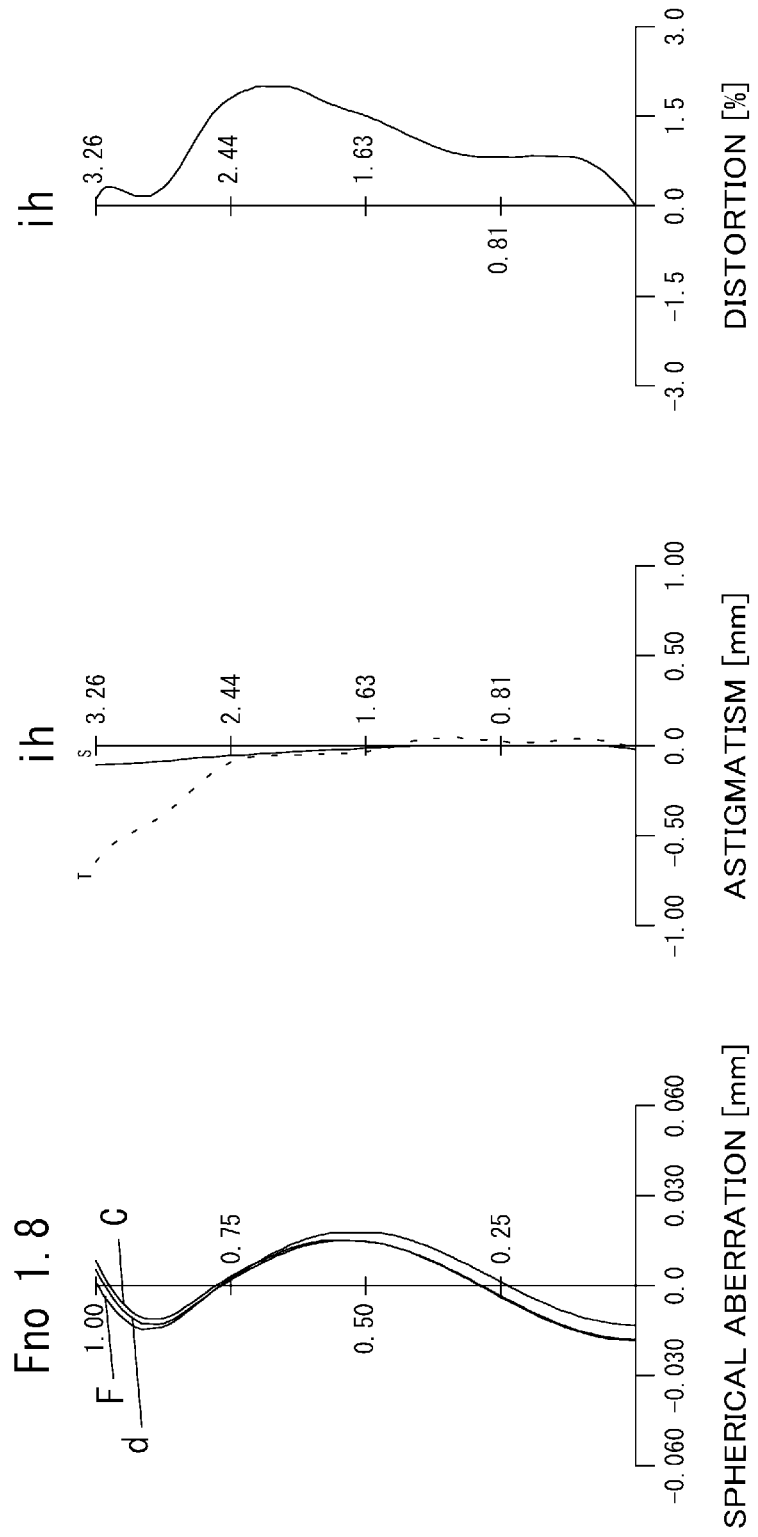
FIG. 12 shows spherical aberration, astigmatism, and distortion of the imaging lens in Example 6 according to the present invention.
Figure 13:
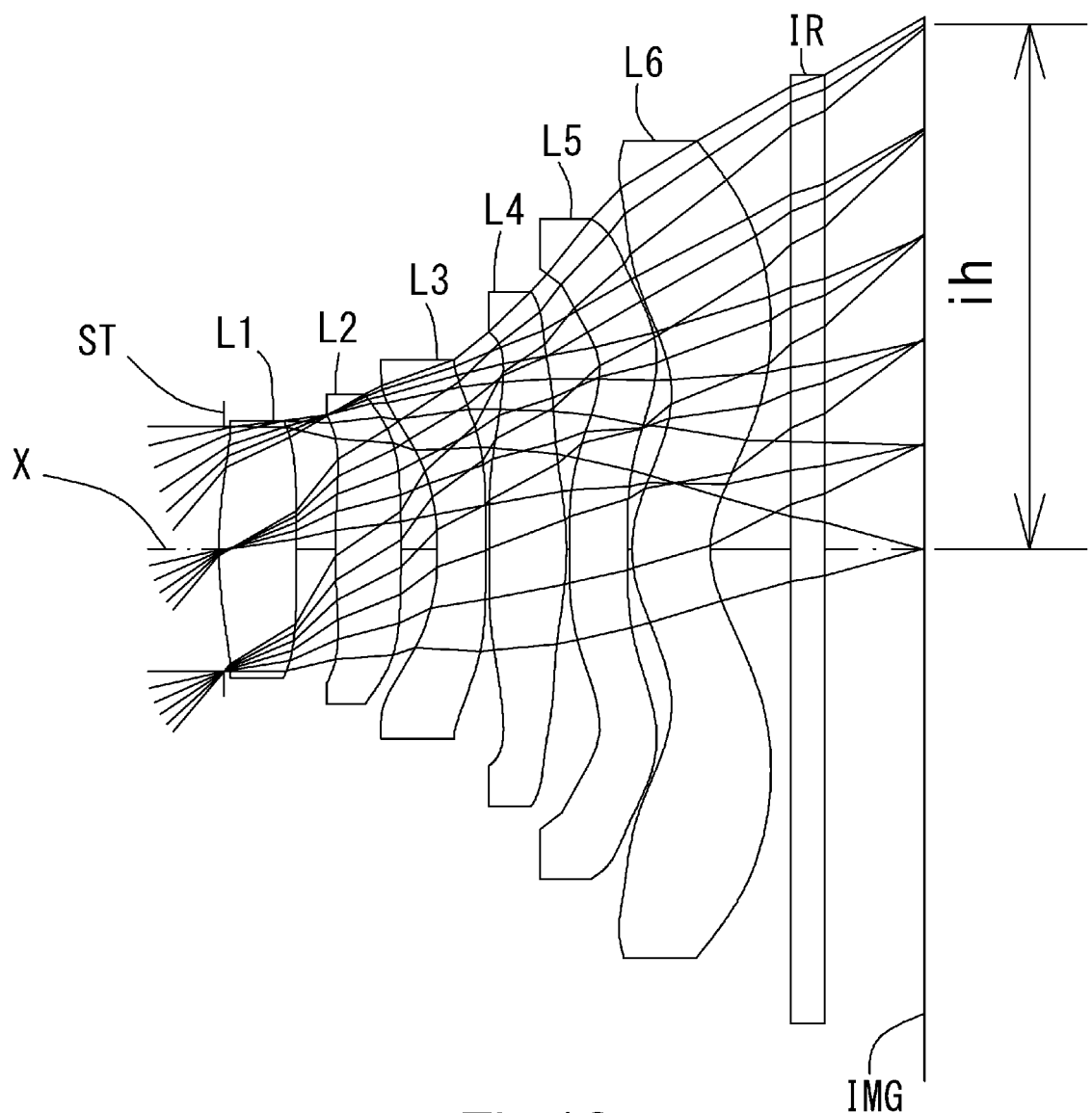
FIG. 13 is a schematic view showing the general configuration of an imaging lens in Example 7 according to the present invention.

FIG. 12 shows spherical aberration (mm), astigmatism (mm), and distortion (%) of the imaging lens in Example 6.

As shown in FIG. 12, each aberration is corrected excellently.

EXAMPLE 7

The basic lens data is shown below in Table 7.

TABLE 7

Example 7

Unit mm f = 2.81  ih = 3.26
Fno = 1.8  TTL = 4.25
ω(°) = 50.0

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.0325 | | |
| 2* | 2.6482 | 0.4779 | 1.544 | 55.86 (vd1) |
| 3* | 21.3167 | 0.2448 | | |

TABLE 7-continued

Example 7

| | | | | |
|---|---|---|---|---|
| 4* | 4.4669 | 0.4057 | 1.535 | 55.66 (vd2) |
| 5* | −26.3020 | 0.2268 | | |
| 6* | −2.0213 | 0.3000 | 1.661 | 20.37 (vd3) |
| 7* | −13.4597 | 0.0208 | | |
| 8* | −10.3341 | 0.4783 | 1.544 | 55.86 (vd4) |
| 9* | −2.0235 | 0.0200 | | |
| 10* | Infinity | 0.3600 | 1.661 | 20.37 (vd5) |
| 11* | Infinity | 0.0264 | | |
| 12* | 0.7824 | 0.4857 | 1.535 | 55.66 (vd6) |
| 13* | 0.6782 | 0.5000 | | |
| 14 | Infinity | 0.2100 | 1.517 | 64.20 |
| 15 | Infinity | 0.5669 | | |
| Image Plane | Infinity | | | |

Constituent Lens Data

| Lens | Start Surface | Focal Length |
|---|---|---|
| 1 | 2 | 5.506 |
| 2 | 4 | 7.173 |
| 3 | 6 | −3.638 |
| 4 | 8 | 4.531 |
| 5 | 10 | Infinity |
| 6 | 12 | 15.253 |

Aspheric Surface Data

| | Second Surface | Third Surface | Fourth Surface | Fifth Surface | Sixth Surface | Seventh Surface |
|---|---|---|---|---|---|---|
| k | 2.472955E+00 | 0.000000E+00 | −1.000000E+00 | −9.999999E−01 | −1.000000E+00 | 0.000000E+00 |
| A4 | −9.148951E−02 | −1.626906E−01 | −1.643676E−01 | −1.499051E−01 | −5.784550E−01 | −2.334739E−02 |
| A6 | −1.003969E−02 | −1.270262E−01 | −1.405476E−02 | −8.795773E−03 | 1.580392E+00 | −2.640383E−02 |
| A8 | −1.175108E−01 | 6.505164E−02 | −4.758153E−01 | −5.995714E−01 | −4.789919E+00 | −1.621203E+00 |
| A10 | 0.000000E+00 | −2.950093E−02 | 3.913980E−01 | 6.759232E−01 | 9.854858E+00 | 4.023703E+00 |
| A12 | 0.000000E+00 | 0.000000E+00 | 0.000000E+00 | −1.271616E−01 | −1.118269E+01 | −3.926083E+00 |
| A14 | 0.000000E+00 | 0.000000E+00 | 0.000000E+00 | 2.139518E−02 | 6.626144E+00 | 1.752123E+00 |
| A16 | 0.000000E+00 | 0.000000E+00 | 0.000000E+00 | −3.626468E−02 | −1.604280E+00 | −2.944286E−01 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | −1.232784E+01 | −3.360798E+01 | 0.000000E+00 | 0.000000E+00 | −2.148448E+00 | −2.508419E+00 |
| A4 | 6.137630E−01 | −2.488437E−01 | 7.583641E−01 | 5.726725E−01 | −2.862441E−01 | −2.262405E−01 |
| A6 | −1.040908E+00 | 1.208180E+00 | −1.191706E+00 | −7.104699E−01 | 4.475700E−02 | 1.007643E−01 |
| A8 | 8.735916E−01 | −1.912512E+00 | 1.064228E+00 | 4.208414E−01 | 1.595003E−02 | −2.624835E−02 |
| A10 | −4.017928E−01 | 1.470622E+00 | −6.563438E−01 | −1.561038E−01 | −5.046308E−03 | 3.943571E−03 |
| A12 | 8.951159E−02 | −6.019950E−01 | 2.467789E−01 | 3.653295E−02 | 2.044365E−04 | −3.099407E−04 |
| A14 | −2.211894E−03 | 1.267435E−01 | −4.839913E−02 | −4.788211E−03 | 5.760857E−05 | 7.457861E−06 |
| A16 | −2.863722E−03 | −1.088079E−02 | 3.723050E−03 | 2.605478E−04 | −4.902575E−06 | 2.946515E−07 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

The imaging lens in Example 7 satisfies conditional expressions (1) to (17) as shown in Table 8.

Figure 14:
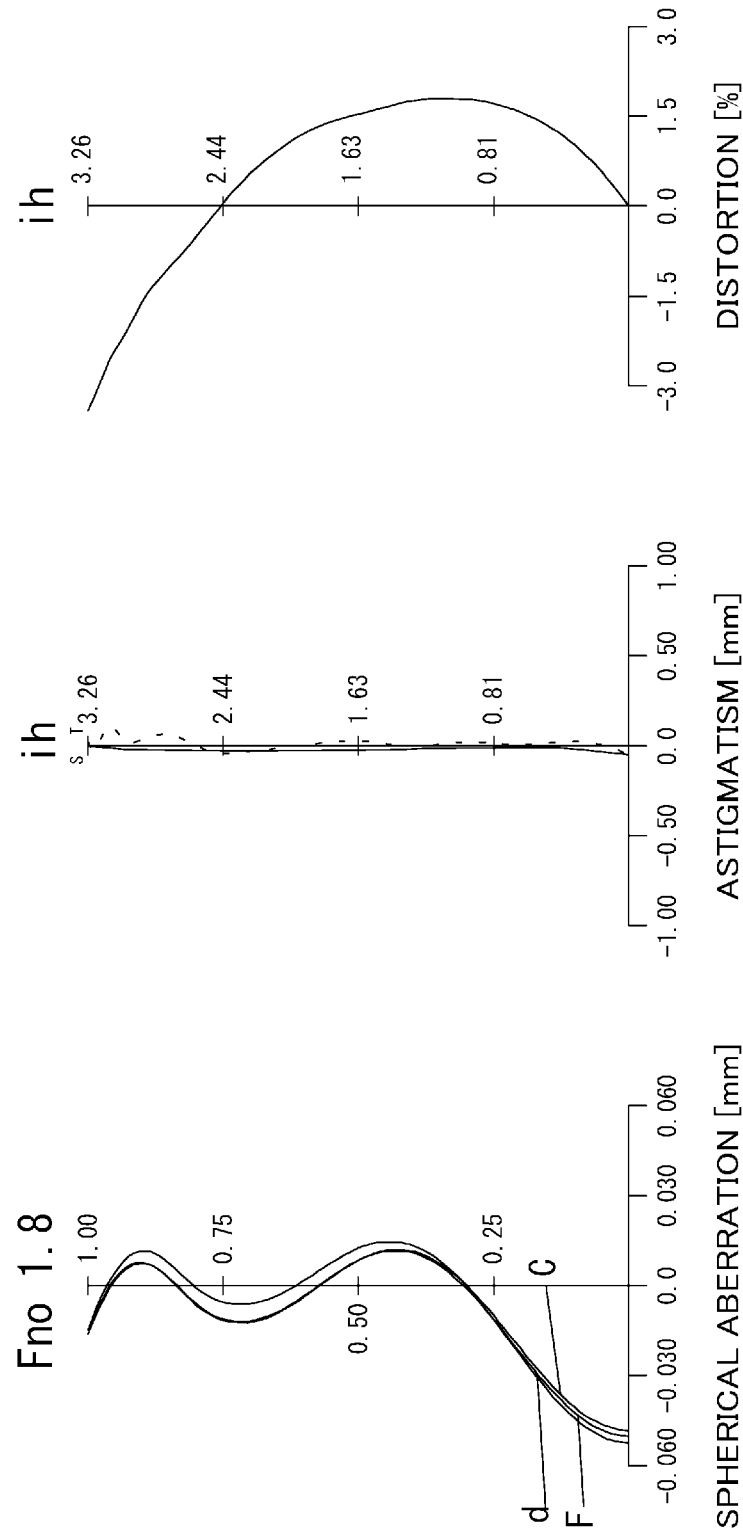
FIG. 14 shows spherical aberration, astigmatism, and distortion of the imaging lens in Example 7 according to the present invention.

FIG. 14 shows spherical aberration (mm), astigmatism (mm), and distortion (%) of the imaging lens in Example 7.

As shown in FIG. 14, each aberration is corrected excellently.

In table 8, values of conditional expressions (1) to (17) related to the Examples 1 to 7 are shown.

TABLE 8

| Conditional Expression | Example 1 | Example 2 | Example 3 | Example 4 | Example 5 | Example 6 | Example 7 |
|---|---|---|---|---|---|---|---|
| (1) vd4 /vd5 | 2.18 | 2.18 | 2.18 | 2.18 | 2.18 | 2.18 | 2.74 |
| (2) (T3/TTL)*100 | 0.63 | 0.49 | 0.51 | 0.51 | 0.51 | 0.51 | 0.49 |
| (3) vd1/(vd2 + vd3) | 0.73 | 0.73 | 0.73 | 0.73 | 0.73 | 0.73 | 0.73 |
| (4) f1/f | 2.51 | 2.34 | 2.32 | 1.97 | 2.01 | 1.97 | 1.96 |
| (5) f2/f | 1.20 | 1.42 | 1.45 | 1.84 | 1.79 | 1.82 | 2.56 |
| (6) f3/f | −0.99 | −0.95 | −1.07 | −1.01 | −0.99 | −0.98 | −1.30 |
| (7) f4/f | 1.31 | 1.18 | 1.03 | 0.96 | 0.93 | 0.93 | 1.61 |
| (8) |f6|/f | 12.47 | 14.96 | 2.83 | 3.08 | 3.10 | 3.15 | 5.43 |
| (9) D6/ΣD | 0.20 | 0.22 | 0.17 | 0.17 | 0.17 | 0.17 | 0.19 |
| (10) Σ(L1F − L6R)/f | 1.10 | 1.16 | 1.11 | 1.20 | 1.16 | 1.16 | 1.09 |

TABLE 8-continued

| Conditional Expression | Example 1 | Example 2 | Example 3 | Example 4 | Example 5 | Example 6 | Example 7 |
|---|---|---|---|---|---|---|---|
| (11) r5/r6 | 0.50 | 0.49 | 0.49 | 0.47 | 0.47 | 0.48 | 0.15 |
| (12) r11/f | 0.40 | 0.38 | 0.39 | 0.37 | 0.36 | 0.36 | 0.28 |
| (13) r12/f | 0.32 | 0.30 | 0.27 | 0.25 | 0.25 | 0.25 | 0.24 |
| (14) Fno | 1.80 | 1.80 | 1.80 | 1.80 | 1.80 | 1.80 | 1.80 |
| (15) f2/f4 | 0.92 | 1.20 | 1.42 | 1.91 | 1.93 | 1.95 | 1.58 |
| (16) T3/T4 | 0.87 | 1.00 | 1.00 | 1.00 | 1.00 | 1.00 | 1.04 |
| (17) (D5/TTL)*100 | 8.76 | 8.89 | 8.78 | 7.70 | 7.22 | 7.38 | 8.47 |

When the imaging lens according to the present invention is adopted to a product with the camera function, there is realized contribution to the low-profileness and the low F-number of the camera and also high performance thereof.

DESCRIPTION OF REFERENCE NUMERALS

ST: aperture stop,
L1: first lens,
L2: second lens,
L3: third lens,
L4: fourth lens,
L5: fifth lens,
L6: sixth lens,
IMG: image plane,
IR: filter, and
ih: maximum image height.

What is claimed is:

1. An imaging lens comprising in order from an object side to an image side,
a first lens having positive refractive power,
a second lens having the positive refractive power,
a third lens,
a fourth lens having a convex surface facing the object side near an optical axis,
a fifth lens being a double-sided aspheric lens, and
a sixth lens being a double-sided aspheric lens and having a concave surface facing the image side near an optical axis, wherein an image-side surface of said sixth lens is an aspheric surface changing to the convex surface at a peripheral area, and below conditional expressions (1) and (2) are satisfied:

$$1.5 < vd4/vd5 < 3.6 \qquad (1)$$

$$0.30 < (T3/TTL) \times 100 < 0.85 \qquad (2)$$

where
vd4: abbe number at d-ray of a fourth lens,
vd5: abbe number at d-ray of a fifth lens,
T3: distance along an optical axis from an image-side surface of the third lens to an object-side surface of the fourth lens, and
TTL: distance along an optical axis from an object-side surface of the first lens to an image plane.

2. The imaging lens according to claim 1, wherein a below conditional expression (3) is satisfied:

$$0.5 < vd1/(vd2+vd3) < 1.0 \qquad (3)$$

where
vd1: abbe number at d-ray of a first lens,
vd2: abbe number at d-ray of a second lens, and
vd3: abbe number at d-ray of a third lens.

3. The imaging lens according to claim 1, wherein said second lens has a biconvex shape having convex surfaces facing the object side and the image side near the optical axis.

4. The imaging lens according to claim 1, wherein said second lens has a meniscus shape having a concave surface facing the object side near the optical axis.

5. The imaging lens according to claim 1, wherein said fourth lens has a biconvex shape having convex surfaces facing the object side and the image side near the optical axis.

6. The imaging lens according to claim 1, wherein said fourth lens has a meniscus shape having a concave surface facing the object side near the optical axis.

7. The imaging lens according to claim 1, wherein a below conditional expression (4) is atisfied:

$$1.35 < f1/f < 3.30 \qquad (4)$$

where
f1: focal length of the first lens, and
f: focal length of the overall optical system.

8. The imaging lens according to claim 1, wherein a below conditional expression (5) is satisfied:

$$0.8 < f2/f < 3.4 \qquad (5)$$

where
f2: focal length of the second lens, and
f: focal length of the overall optical system.

9. The imaging lens according to claim 1, wherein a below conditional expression (6) is satisfied:

$$-1.70 < f3/f < -0.65 \qquad (6)$$

where
f3: focal length of the third lens, and
f: focal length of the overall optical system.

10. The imaging lens according to claim 1, wherein a below conditional expression (7) is satisfied:

$$0.65 < f4/f < 2.10 \qquad (7)$$

where
f4: focal length of the fourth lens, and
f: focal length of the overall optical system.

11. The imaging lens according to claim 1, wherein a below conditional expression (8) is satisfied:

$$1.9 < |f6|/f \qquad (8)$$

where
f6: focal length of the sixth lens, and
f: focal length of the overall optical system.

12. The imaging lens according to claim 1, wherein said fifth lens has plane surfaces on both sides near the optical axis.

13. The imaging lens according to claim 1, wherein a below conditional expression (9) is satisfied:

$$0.1 < D6/\Sigma D < 0.3 \qquad (9)$$

where

D6: thickness on the optical axis of the sixth lens, and

ΣD: total sum of thickness on the optical axis of the first lens, the second lens, the third lens, the fourth lens, the fifth lens and the sixth lens.

14. The imaging lens according to claim 1, wherein a below conditional expression (10) is satisfied:

$$0.7<\Sigma(L1F-L6R)/f<1.6 \tag{10}$$

where

Σ(L1F–L6R): distance along the optical axis from the object-side surface of the first lens to the image-side surface of the sixth lens, and f: focal length of the overall optical system.

15. The imaging lens according to claim 1, wherein a below conditional expression (11) is satisfied:

$$0.1<r5/r6<0.7 \tag{11}$$

where r5: paraxial curvature radius of the object-side surface of the third lens, and r6: paraxial curvature radius of the image-side surface of the third lens.

16. The imaging lens according to claim 1, wherein a below conditional expressions (12) and (13) are satisfied:

$$0.20<r11/f<0.55 \tag{12}$$

$$0.15<r12/f<0.45 \tag{13}$$

where r11: paraxial curvature radius of the object-side surface of the sixth lens, r12: paraxial curvature radius of the image-side surface of the sixth lens, and f: focal length of the overall optical system.

17. The imaging lens according to claim 1, wherein a below conditional expression (14) is satisfied:

$$Fno \leq 2.0 \tag{14}$$

where

Fno: F-number.

18. The imaging lens according to claim 1, wherein a below conditional expression (15) is satisfied:

$$0.6<f2/f4<2.6 \tag{15}$$

where f2: focal length of the second lens, and f4: focal length of the fourth lens.

19. The imaging lens according to claim 1, wherein a below conditional expression (16) is satisfied:

$$0.60<T3/T4<1.35 \tag{16}$$

where

T3: distance along an optical axis from an image-side surface of the third lens to an object-side surface of the fourth lens, and T4: distance along an optical axis from an image-side surface of the fourth lens to an object-side surface of the fifth lens.

20. The imaging lens according to claim 1, wherein a below conditional expression (17) is satisfied:

$$5<(D5/TTL)\times 100<12 \tag{17}$$

where

D5: thickness on the optical axis of the fifth lens, and

TTL: distance along an optical axis from an object-side surface of the first lens to an image plane.

* * * * *